(12) United States Patent
Yang et al.

(10) Patent No.: US 9,711,168 B1
(45) Date of Patent: Jul. 18, 2017

(54) METHOD FOR PROVIDING A MAGNETIC RECORDING WRITE APPARATUS BY PREDEFINING SIDE SHIELDS

(71) Applicant: Western Digital (Fremont), LLC, Fremont, CA (US)

(72) Inventors: Xiaoyu Yang, Union City, CA (US); Jinqiu Zhang, Fremont, CA (US); Feng Liu, San Ramon, CA (US); Xiaotian Zhou, Fremont, CA (US); Hai Sun, Milpitas, CA (US); Ming Jiang, San Jose, CA (US)

(73) Assignee: WESTERN DIGITAL (FREMONT), LLC, Fremont, CA (US)

( * ) Notice: Subject to any disclaimer, the term of this patent is extended or adjusted under 35 U.S.C. 154(b) by 0 days.

(21) Appl. No.: 15/156,877

(22) Filed: May 17, 2016

(51) Int. Cl.
*G11B 5/187* (2006.01)
*G11B 5/11* (2006.01)

(52) U.S. Cl.
CPC .............. *G11B 5/187* (2013.01); *G11B 5/112* (2013.01)

(58) Field of Classification Search
CPC .................................. G11B 5/187; G11B 5/112
See application file for complete search history.

(56) References Cited

U.S. PATENT DOCUMENTS

| | | |
|---|---|---|
| 7,398,592 B2 | 7/2008 | Le et al. |
| 7,788,798 B2 | 9/2010 | Guthrie et al. |
| 7,952,831 B2 | 5/2011 | Kim et al. |
| 8,049,989 B2 | 11/2011 | Jiang et al. |
| 8,051,552 B2 | 11/2011 | Jiang et al. |
| 8,066,892 B2 | 11/2011 | Guthrie et al. |
| 8,117,738 B2 | 2/2012 | Han et al. |
| 8,134,802 B2 | 3/2012 | Bai et al. |
| 8,179,634 B2 | 5/2012 | Hsiao et al. |
| 8,189,293 B1 | 5/2012 | Wakabayashi et al. |
| 8,233,235 B2 | 7/2012 | Chen et al. |
| 8,238,059 B1 | 8/2012 | Tang et al. |
| 8,254,060 B1 | 8/2012 | Shi et al. |
| 8,322,023 B1 | 12/2012 | Zeng et al. |
| 8,345,383 B2 | 1/2013 | Yan et al. |
| 8,400,733 B2 | 3/2013 | Shin et al. |
| 8,404,128 B1 | 3/2013 | Zhang et al. |
| 8,451,563 B1 | 5/2013 | Zhang et al. |
| 8,470,186 B2 | 6/2013 | Chen et al. |
| 8,488,272 B1 | 7/2013 | Tran et al. |
| 8,498,079 B1 | 7/2013 | Song et al. |

(Continued)

*Primary Examiner* — Nadine Norton
*Assistant Examiner* — Mahmoud Dahimene
(74) *Attorney, Agent, or Firm* — Foley & Lardner LLP

(57) ABSTRACT

A method provides magnetic write apparatus. A side shield location layer having a location corresponding to the side shield(s) and back and side surfaces is provided. Part of the back surface corresponds to the back surface of the side shield. A nonmagnetic layer adjoining the back and side surface(s) of the side shield location layer is provided. A pole trench is formed in the layers using a first etch process. The nonmagnetic and side shield location layers have an etch selectivity of at least 0.9 and not more than 1.1 for the first etch. A pole is provided in the pole trench. A remaining portion of the side shield location layer is removed using a wet etch. The nonmagnetic layer is nonremovable by the wet etch. Side shield(s) having a back surface substantially the same as the back surface of the side shield location layer are provided.

14 Claims, 24 Drawing Sheets

(56) References Cited

U.S. PATENT DOCUMENTS

| | | |
|---|---|---|
| 8,533,937 B1 | 9/2013 | Wang et al. |
| 8,576,517 B1 | 11/2013 | Tran et al. |
| 8,582,238 B1 | 11/2013 | Liu et al. |
| 8,611,046 B2 | 12/2013 | Wu et al. |
| 8,614,860 B2 | 12/2013 | Han et al. |
| 8,625,235 B2 | 1/2014 | Takano et al. |
| 8,724,258 B2 | 5/2014 | Zhang et al. |
| 8,792,208 B1 | 7/2014 | Liu et al. |
| 9,275,657 B1 | 3/2016 | Zhang et al. |
| 2006/0066995 A1* | 3/2006 | Lille .................. G11B 5/1278 360/125.12 |
| 2011/0075299 A1 | 3/2011 | Olson et al. |
| 2012/0257305 A1 | 10/2012 | Tang et al. |
| 2014/0016232 A1 | 1/2014 | Guan |
| 2014/0078619 A1 | 3/2014 | Song et al. |

\* cited by examiner

250

250'

250'

METHOD FOR PROVIDING A MAGNETIC RECORDING WRITE APPARATUS BY PREDEFINING SIDE SHIELDS

BACKGROUND

FIGS. 1A and 1B depict ABS and top views of a conventional magnetic recording apparatus 10. The magnetic recording apparatus 10 may be a perpendicular magnetic recording (PMR) apparatus or other magnetic write apparatus. The conventional magnetic recording apparatus 10 may be a part of a merged head including the write apparatus 10 and a read apparatus (not shown). Alternatively, the magnetic recording head may only include the write apparatus 10.

The write apparatus 10 includes a leading shield 12, a nonmagnetic gap layer 14, side shield(s) 15, a pole 20 and a trailing shield 30. The apparatus 10 may also include other components including but not limited to coils for energizing the pole 20. The trailing surface (top) of the pole 20 is wider than the leading surface (bottom) of the pole 20.

Although the conventional magnetic recording apparatus 10 functions, there are drawbacks. In particular, the side shields 16 may have tails 17 developed during fabrication. These tails 17 cause the side shields 16 to have a longer effective throat height (distance from the ABS). The tails 17 also result in additional shunting of magnetic flux from the pole 20. Thus, performance may be adversely affected. Accordingly, what is needed is a system and method for improving the performance of a magnetic recording write apparatus 10.

BRIEF DESCRIPTION OF SEVERAL VIEWS OF THE DRAWINGS

FIGS. 5A, 5B and 5C through FIGS. 18A, 18B, 18C and 18D depict various views of a magnetic recording apparatus during fabrication.

FIGS. 20A, 20B and 20C through FIGS. 25A, 25B, 25C and 25D depict apex, ABS and top views of a magnetic recording apparatus during fabrication.

DETAILED DESCRIPTION OF THE PREFERRED EMBODIMENTS

While the various embodiments disclosed are applicable to a variety of data storage devices such as magnetic recording disk drives, solid-state hybrid disk drives, networked storage systems etc., for the sake of illustration the description below uses disk drives as examples.

Figure 1A:
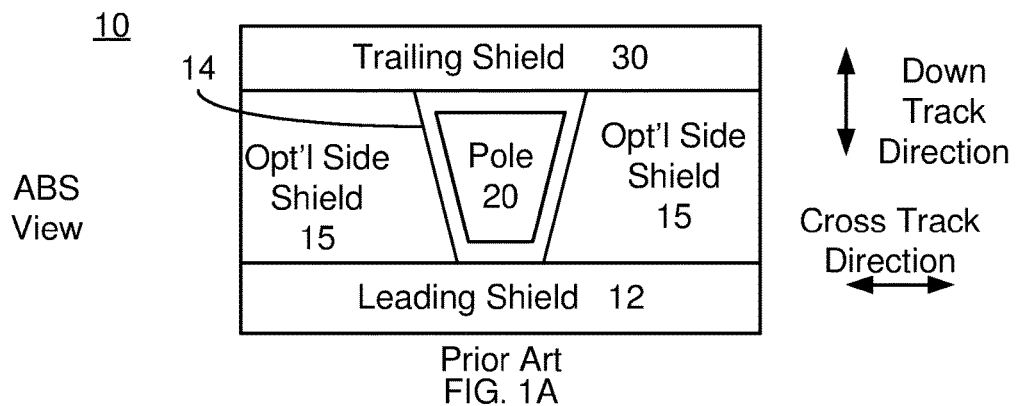
FIGS. 1A-1B depict ABS and top views of a conventional magnetic recording apparatus.
Figure 1B:
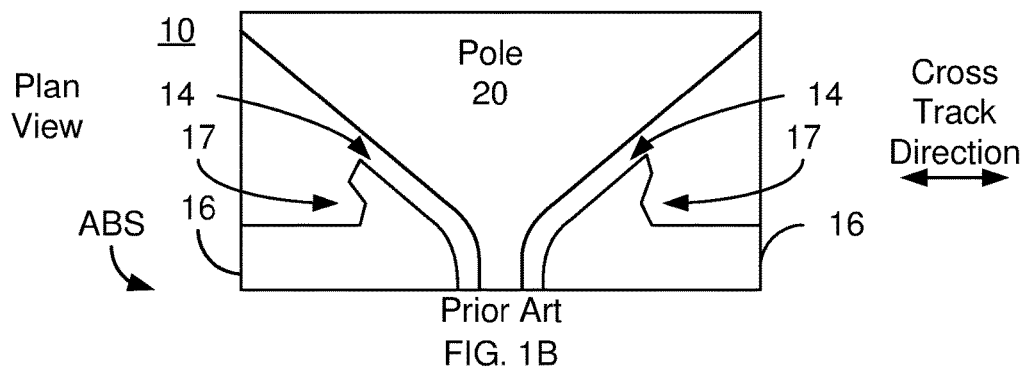
Figure 2:
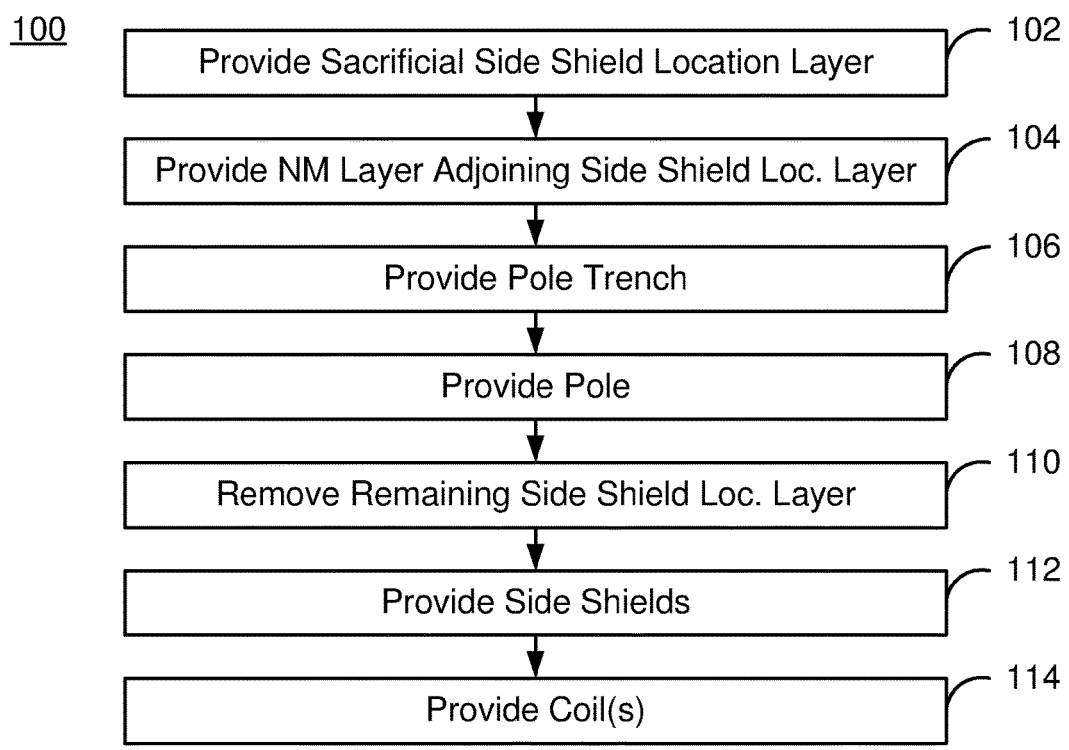
FIG. 2 is a flow chart depicting an exemplary embodiment of a method for providing a magnetic recording apparatus.

FIG. 2 is a flow chart depicting an exemplary embodiment of a method 100 for providing a magnetic recording apparatus. For simplicity, some steps may be omitted, interleaved, combined and/or include substeps. The method 100 is also described in the context of providing a particular data storage device and magnetic recording apparatus. The method 100 may also be used to fabricate other magnetic recording apparatuses. The method 100 may be used to fabricate multiple magnetic recording apparatuses at substantially the same time. The method 100 is also described in the context of particular layers. A particular layer may include multiple materials and/or multiple sub-layers. The method 100 also may start after formation of other portions of the magnetic recording head. For example, the method 100 may start after a read apparatus, return pole/leading shield and/or other structure have been fabricated.

A side shield location layer is provided, via step 102. This layer is a sacrificial layer and occupies the region in which the side shields are to be formed. Consequently, some or all of the side shield location layer is removed later in fabrication. The side shield location layer has a back surface, at least a portion of which corresponds to the back surface of the side shields to be formed. For example, if the side gap between the pole and the side shields is desired to have different thicknesses, then the back surface of the side shield location layer may be shaped to match the desired profile of the side shields. The side shield location layer also includes at least one side surface.

Step 102 may include full film depositing the material for the side shield location layer, covering the portion which will form the side shield location layer, and then removing the exposed portion. In some embodiments, the mask used may be a hard mask. The exposed portion may be removed by an etch such as a reactive ion etch (RIE). The side shield location layer may include one or more of aluminum oxide and NiFe. In some embodiments, the side shield location layer consists of aluminum oxide. In other embodiments, the side shield location layer consists of NiFe.

A nonmagnetic layer is provided, via step 104. The nonmagnetic layer may include silicon dioxide. In some embodiments, the nonmagnetic layer consists of silicon dioxide. The nonmagnetic layer adjoins (shares an interface with) the back surface and the side surface(s) of the side shield location layer. Step 104 may include depositing the nonmagnetic layer over the preexisting side shield location layer and planarizing the magnetic write apparatus. For example, a chemical-mechanical planarization (CMP) may be used. In such a case, step 102 is performed before step 104. Alternatively, the nonmagnetic layer may be deposited first as part of step 104. In such a case, a portion of the nonmagnetic layer is removed, for example via an RIE. A refill step is then performed in step 102 to provide the side shield location layer in this region. Thus, step 102 may be performed after step 104. The nonmagnetic layer and the side shield location layer together form an intermediate layer in which the pole and side shields are to be formed.

A pole trench is provided in the intermediate layer using a first etch process, via step 106. The pole trench has a shape and a location corresponding to the pole. The pole trench has portions in both the nonmagnetic layer and the side shield location layer. The nonmagnetic layer and the side shield location layer have an etch selectivity of at least 0.9 and not more than 1.1 for the first etch. Thus, the removal rate of the nonmagnetic layer divided by the removal rate of the side shield location layer for the first etch is at least 0.9 and not more than 1.1. As a result, the side shield location layer and nonmagnetic layer are removed at approximately the same rate by the first etch.

A pole is provided in the pole trench, via step 108. Step 108 may include depositing a seed layer, such as Ru, and providing the materials for the pole. For example, high saturation magnetization materials for the pole may be plated. A planarization step may also be performed. In some embodiments, leading and/or trailing bevels might be formed. Thus, the top and/or bottom of the pole may not be perpendicular to the media-facing surface, such as an ABS.

A remaining portion of the side shield location layer is removed using a wet etch, via step 110. The side shield location layer is removable by this wet etch. However, the nonmagnetic layer is nonremovable by the wet etch. Thus, in contrast to the etch that formed the pole trench in step 106, the selectivity for this etch is not close to one. Thus, at least part of the region previously occupied by the side shield location layer may be empty.

Side shield(s) are provided, via step 112. Step 112 may include depositing a seed layer and plating the material(s) for the side shield(s). Other deposition methods might be used. The side shield material(s) fill the region previously occupied by the side shield location layer. In some embodiments, a deposition and planarization such as a CMP are performed. The back surface of the side shield(s) are substantially the same as at least a portion of the back surface of the side shield location layer.

The coil(s) for energizing the pole are provided, via step 114. The coil provided in step 114 may be a helical coil surrounding the pole, or a spiral coil. For a helical coil, portions of step 114 may be performed before steps 102 through 112.

Using the method 100, the shape of the side shields may be predefined using the side shield location layer. Thus, the side shields have the desired shape and location. For example, undesirable side effects such as tails 17 may be avoided. Consequently, performance of a magnetic recording apparatus fabricated using the method 100 may be improved.

Figure 3A:
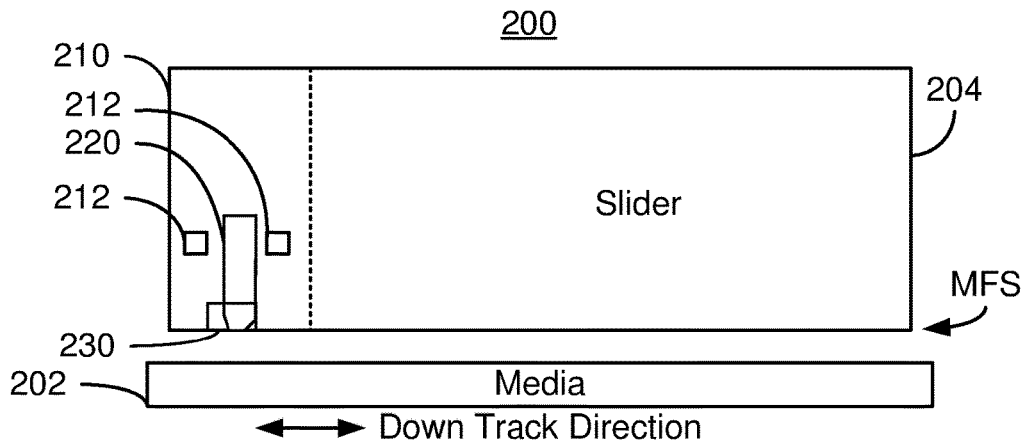
FIGS. 3A, 3B and 3C depict side, FS and top views of an exemplary embodiment of a magnetic recording apparatus.
Figure 3B:
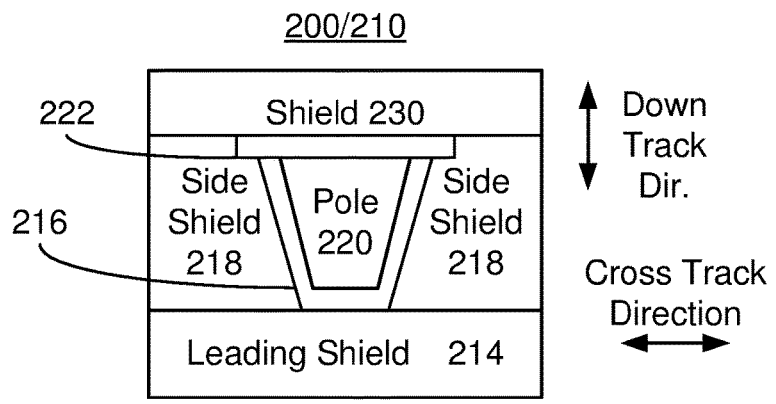
Figure 3C:
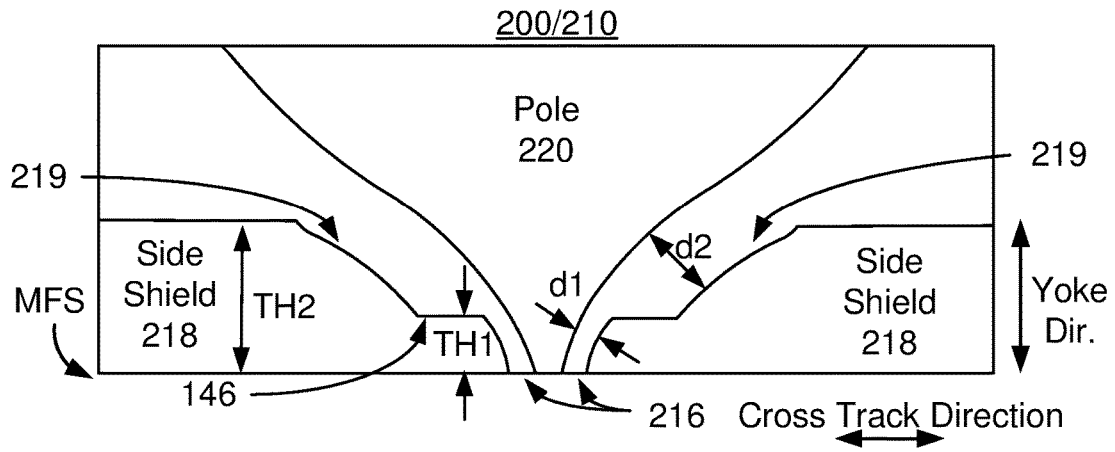

FIGS. 3A, 3B and 3C depict side, media-facing surface (MFS) and top views of an exemplary embodiment of a portion of a data storage device 200 including a write apparatus 210. For clarity, FIGS. 2A, 2B and 2C are not to scale. Because the data storage device is a disk drive, the MFS is an air-bearing surface (ABS). For simplicity not all portions of the disk drive 200 and magnetic write apparatus 210 are shown. In addition, although the disk drive 200 and write apparatus 210 are depicted in the context of particular components other and/or different components may be used. For example, circuitry used to drive and control various portions of the disk drive 200 is not shown. For simplicity, only single components are shown. However, multiples of each components and/or and their sub-components, might be used. The disk drive 200 may be a PMR disk drive. However, in other embodiments, the disk drive 200 may be configured for other types of magnetic recording.

The disk drive 200 includes media 202, a slider 204 and a write apparatus 210. The write apparatus 210 is fabricated on the slider 110 and includes a MFS. In the embodiment shown, the MFS is proximate to the media 202 during use. Although not shown, the slider 204 and thus the apparatus 210 are generally attached to a suspension. In general, the disk drive 200 includes a write apparatus 210 and a read apparatus (not shown). However, for clarity, only the write apparatus 210 is shown. The write apparatus 210 includes coils 212, optional leading shield 214, side gap 216, side shields 218, write pole 220, top (write) gap 222, and optional trailing shield 230. In the embodiment shown, the side gap 216 is also a bottom gap. Multiple structures on which the leading shield 214 and pole 220 are fabricated may reside below the components shown. As discussed above, portions of the components 210, 212, 214, 216, 218, 220, 222 and 230 may include multiple layers. In other embodiments, different and/or additional components may be used in the write apparatus 210.

The coil(s) 212 are used to energize the pole 220. Two turns 212 are depicted in FIG. 3A. Another number of turns may, however, be used. Note that only a portion of the coil(s) 212 is shown in FIG. 3A. Additional turns and/or additional layers of coils may be used. If, for example, the coil(s) 212 form a spiral, coil, then additional portions of the coil(s) 212 may be located further from the ABS. The coil(s) 212 may also be a helical coil.

The pole 220 is ferromagnetic and may have a high saturation magnetization in excess of 2.0 T. The front of the pole 220 occupies a portion of the MFS. This is shown in FIGS. 3A-3C. The pole 220 also includes sidewalls in the cross track direction. The sidewalls are generally configured such that the pole 220 has a bottom and a top wider than the bottom. In addition, the sidewalls are oriented at a flare angle from a direction parallel to the MFS. The flare angle is generally greater than zero and less than ninety degrees. In some embodiments, the flare angle is at least forty-five degrees and not more than seventy degrees.

The side gap 216 is shown as having two widths, d1 and d2. This is because the back surfaces 219 of side shields 218 have been configured with two sections that are parallel to the MFS and two sections that are conformal with the sidewalls of the pole 220. In the embodiment shown, the side shields 218 are conformal with the main pole 220 and at a side gap 216 distance d1 until a first throat height, TH1, from the MFS. The back surface 219 of the side shields 218 has a portion that extends parallel to the MFS at the distance TH1 from the MFS. The back surface 219 has another portion that is conformal with the main pole 220 at a distance d2 until a desired height TH2 in the yoke direction (perpendicular to the MFS). The height TH2 is a second throat height and the depth of the side shields 218 in the embodiment shown in FIGS. 3A-3C. Thus, the side shields 218 have the desired configuration.

The back surface 219 of the side shields 218 and thus the side gap 216 have the desired configuration because the side shield location layer predefined the region in which the side shields 218 were formed. For example, the desired throat heights TH1 and TH2 are achieved without tails or other undesirable artifacts of fabrication. Consequently, the magnetic data storage device 200 may exhibit improved performance.

Figure 4:
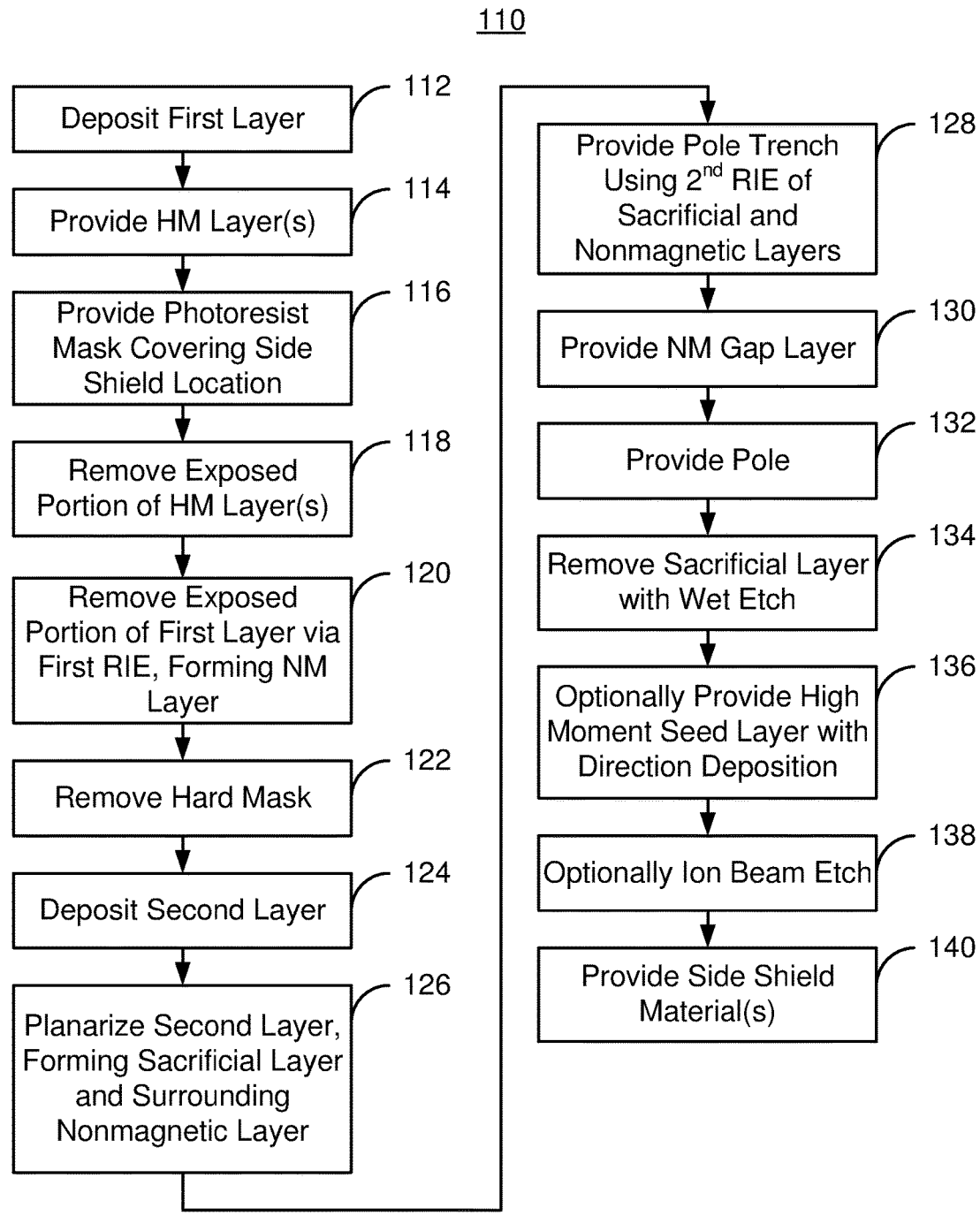
FIG. 4 is a flow chart depicting an exemplary embodiment of a method for providing magnetic recording apparatus.

FIG. 4 depicts an exemplary embodiment of a method 110 for providing a magnetic recording apparatus such as the magnetic recording apparatus 210. For simplicity, some steps may be omitted, interleaved, combined and/or include substeps. FIGS. 5A-5C through FIGS. 18A-18D depict various views of an exemplary embodiment of a magnetic recording apparatus 250 during fabrication using the method 110. The method 110 is thus described in the context of providing the magnetic recording apparatus 250. The method 110 may also be used to fabricate other magnetic recording apparatuses including but not limited to the data storage device 250. The method 110 is described in the context of a single device but may be used to fabricate multiple magnetic storage apparatuses at substantially the same time. The method 110 is also described in the context of particular layers. A particular layer may include multiple materials and/or multiple sub-layers. The method 110 also may start after formation of other portions of the magnetic recording apparatus. For example, the method 110 may start after a read apparatus, return pole/leading shield and/or other structure have been fabricated.

Figure 5A:
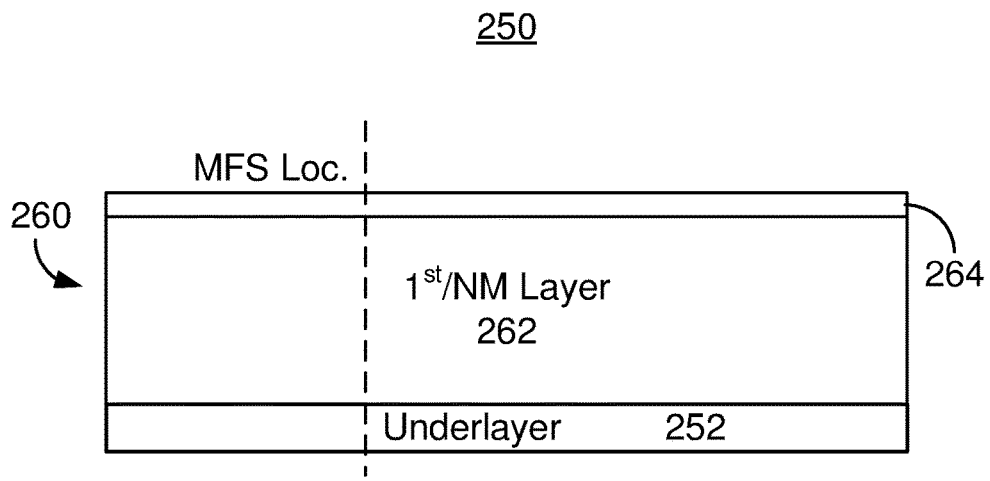
Figure 5B:
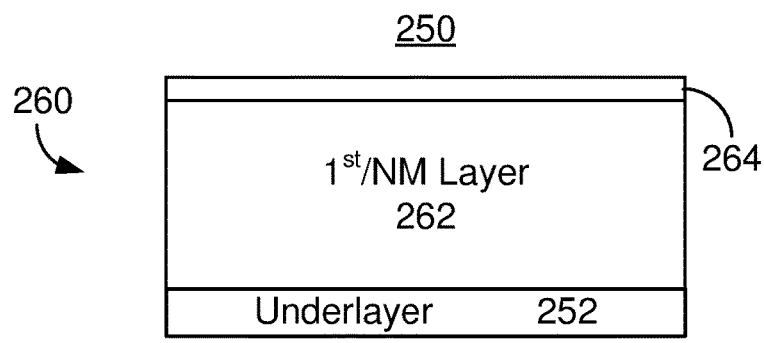
Figure 5C:
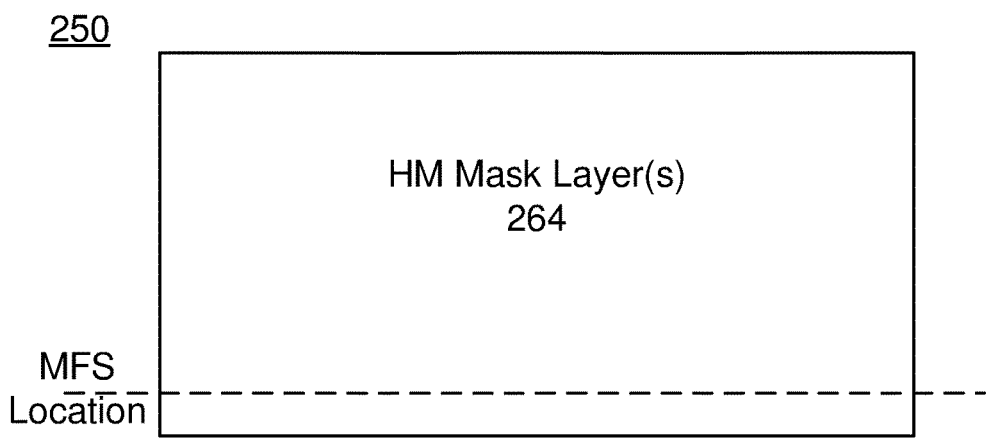

A first layer is full-film deposited, via step 112. The first layer is a nonmagnetic layer, such as a silicon dioxide layer. At least one hard mask layer is deposited on the first layer, via step 114. For example, a Cr/Ta bilayer may be deposited in step 114. FIGS. 5A, 5B and 5C depict apex, MFS and top views of the magnetic write apparatus 250 after step 114 is completed. Thus, the first nonmagnetic layer 262 has been provided on an underlayer 252. The nonmagnetic layer 262 is part of an intermediate layer 260 that is being formed. Also shown are the hard mask layer(s) 264. FIGS. 5A and 5C indicate an MFS location, where the MFS will be located. For example, an ABS may be formed at the MFS location after lapping.

Figure 6A:
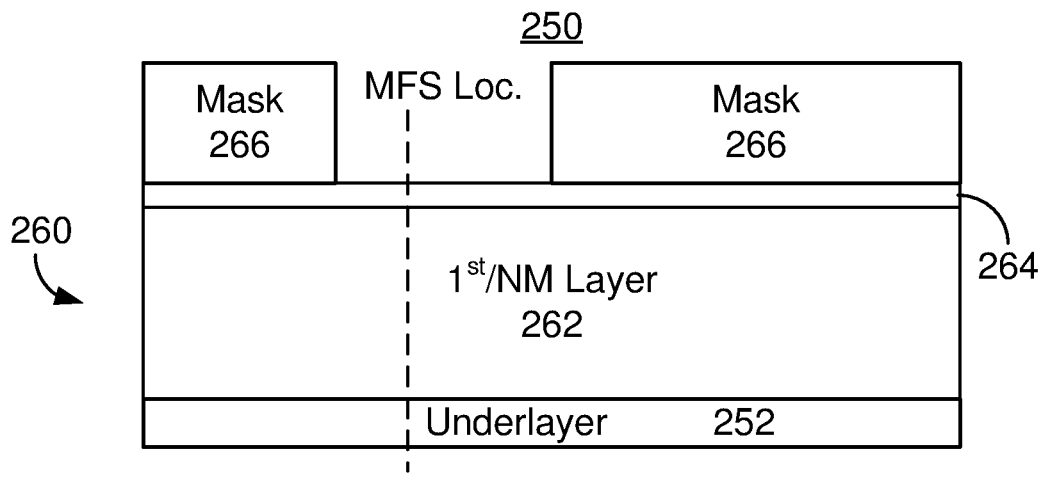
Figure 6B:
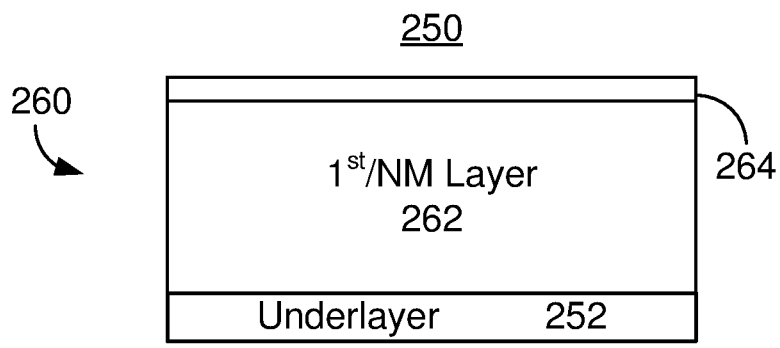
Figure 6C:
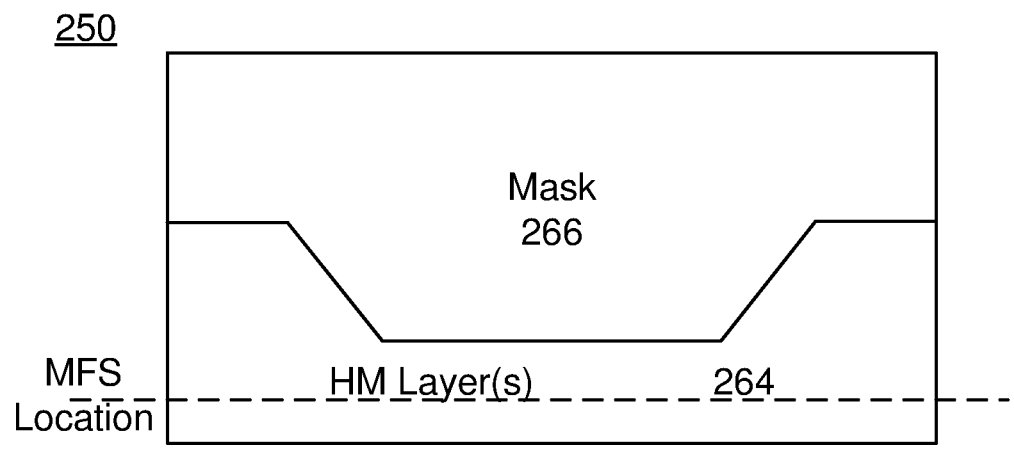

A photoresist mask is provided, via step 116. FIGS. 6A, 6B and 6C depict apex, MFS and top views of the magnetic write apparatus 250 after step 116 is completed. Thus, a photoresist mask 266 has been formed. The mask 266 includes an aperture in the region corresponding to the side shields.

Figure 7A:
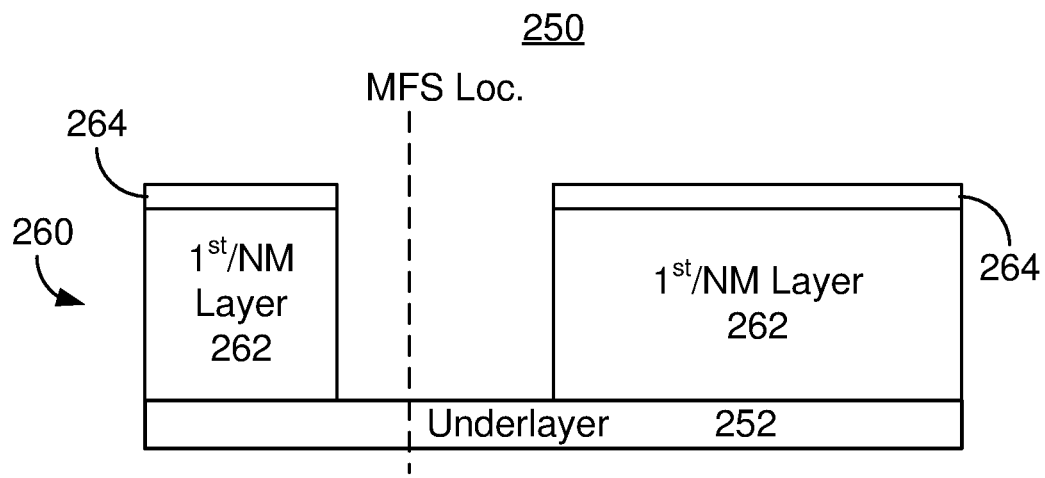
Figure 7B:
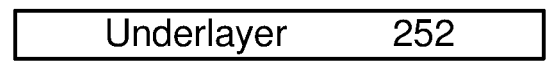
Figure 7C:
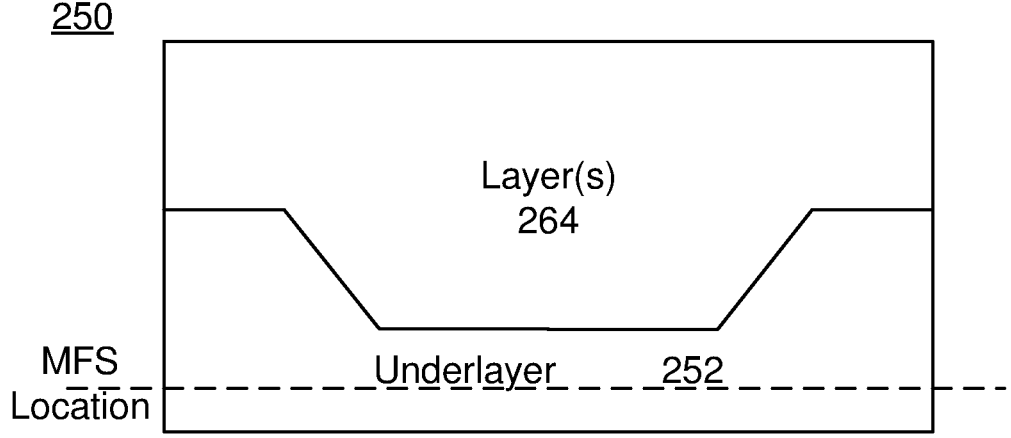

An exposed portion of the hard mask layer is removed to form a hard mask having an aperture at the same location, via step 118. Step 118 may include performing a Ta RIE and a Cr RIE to remove the hard mask layers 264 in the region exposed by the photoresist mask 266. A portion of the nonmagnetic layer 262 exposed by the hard mask 264 is removed, via step 120. Step 120 may be performed using a silicon dioxide RIE. In some embodiments, the underlayer 252 is aluminum oxide. In such embodiments, the silicon oxide RIE may stop at the underlayer 252. FIGS. 7A, 7B and 7C depict apex, MFS and top views of the magnetic write apparatus 250 after step 120 is performed. Thus, a trench having a shape and location corresponding to the side shields is formed in the first layer 252. The trench has a back surface and at least one side surface. A portion of the back surface corresponds to the back surface of the side shield(s).

Figure 8A:
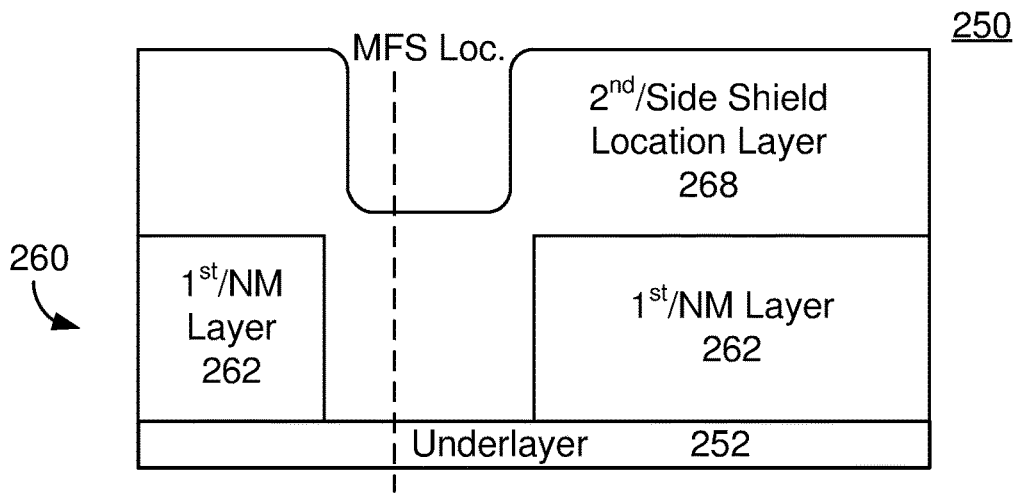
Figure 8B:
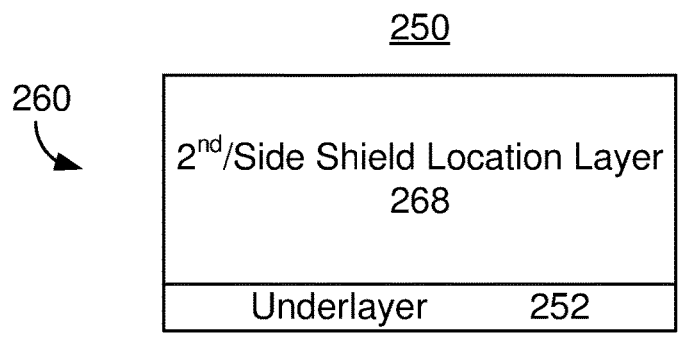
Figure 8C:
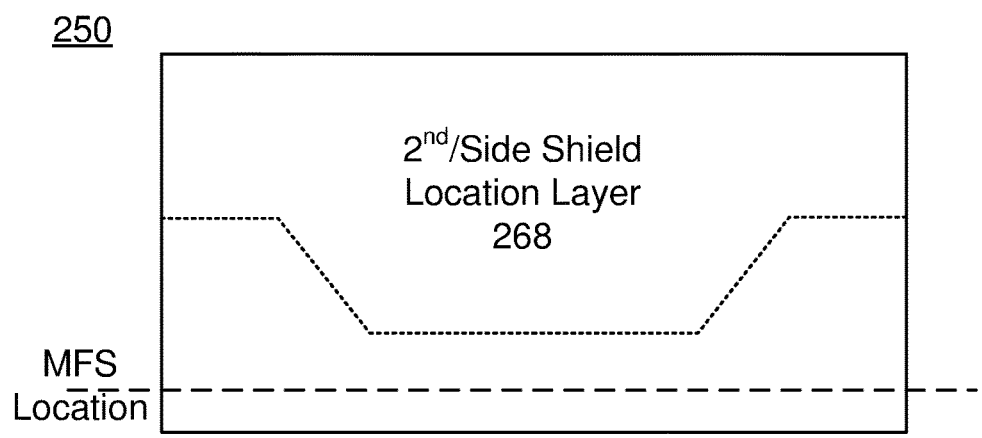

The hard mask 262 is removed, via step 122. A second layer is deposited, via step 124. Step 124 include performing a full film deposition. FIGS. 8A, 8B and 8C depict apex, MFS and top views of the magnetic write apparatus 250 after step 124 is performed. Thus, the second layer 268 is present. The second layer 268 may be selected from aluminum oxide and NiFe.

Figure 9A:
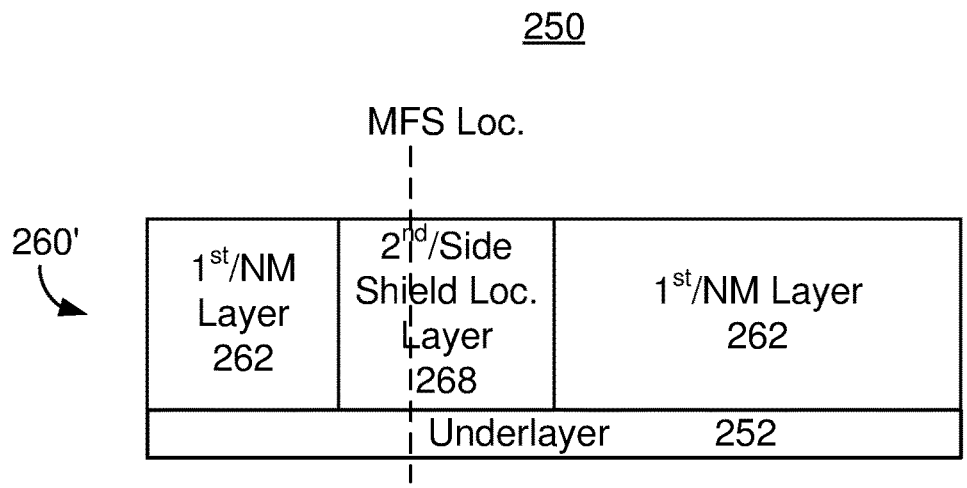
Figure 9B:
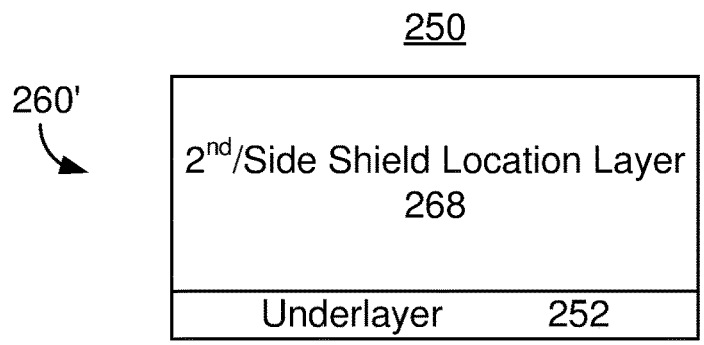
Figure 9C:
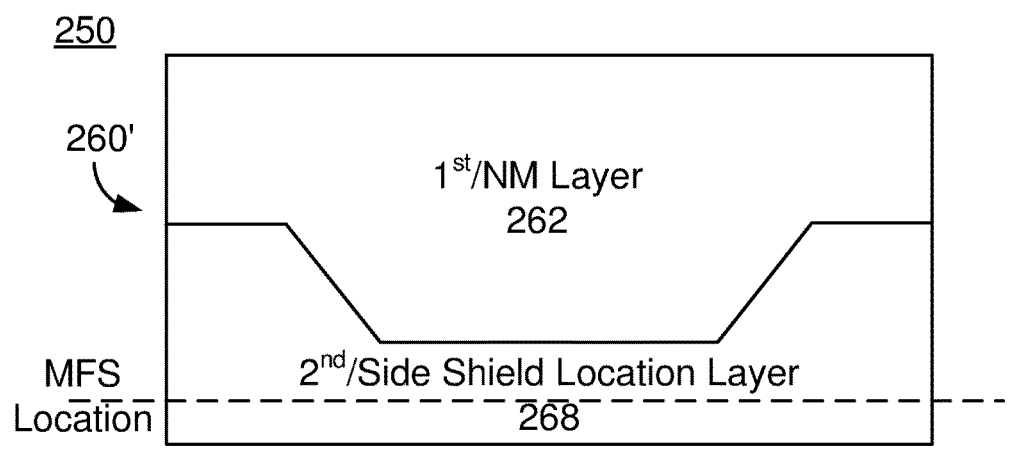

The second layer 268 is planarized, via step 126. Thus, the portion of the second layer 268 covering the nonmagnetic layer 262 is removed. FIGS. 9A, 9B and 9C depict apex, MFS and top views of the magnetic write apparatus 250 after step 126 is completed. A remaining portion of the second layer 268 in the trench forms a side shield location layer 268 having a location corresponding to the side shield. The nonmagnetic layer 262 and the side shield location layer 268 form an intermediate layer 260'.

Figure 10A:
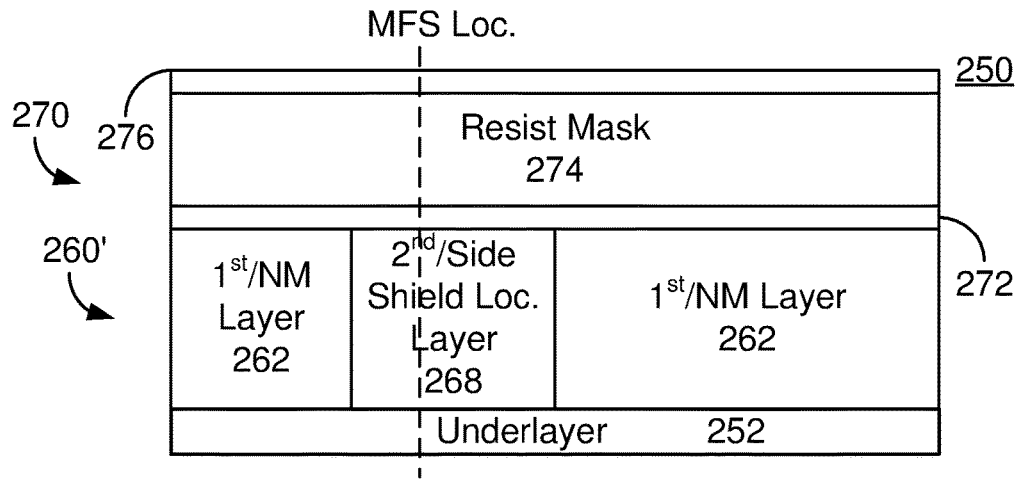
Figure 10B:
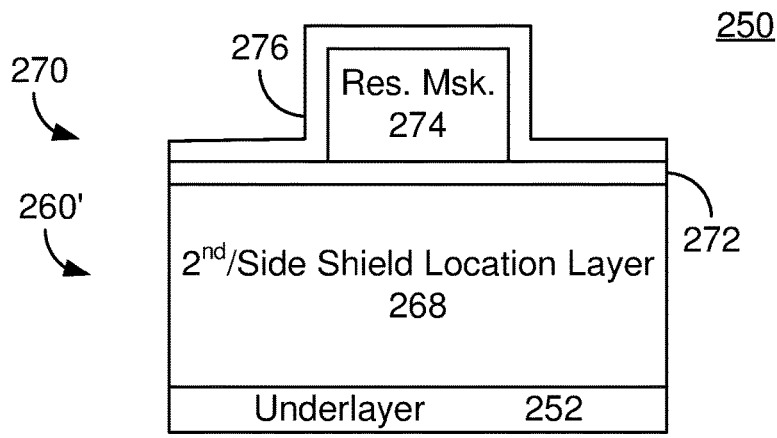
Figure 10C:
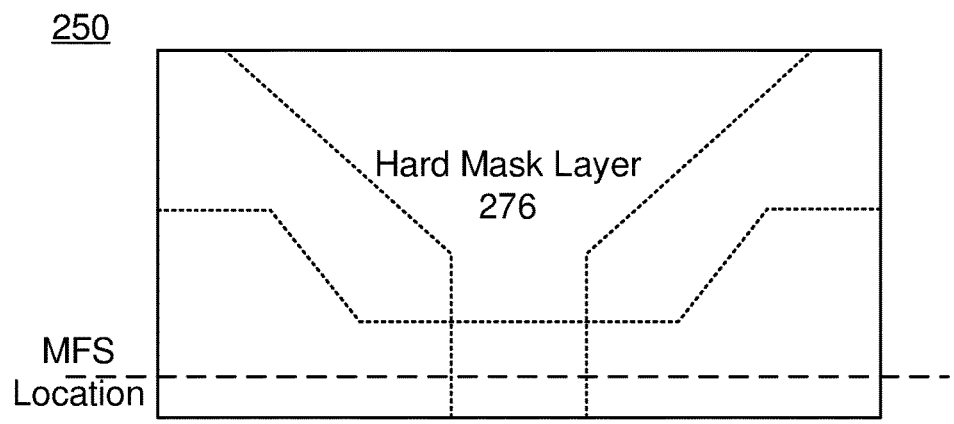
Figure 11A:
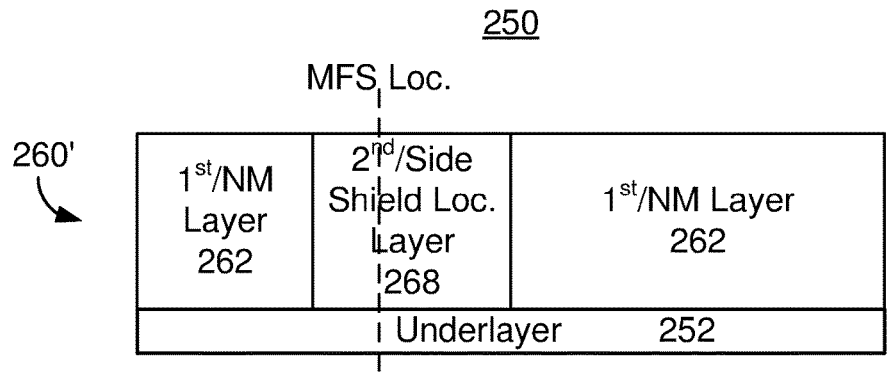
Figure 11B:
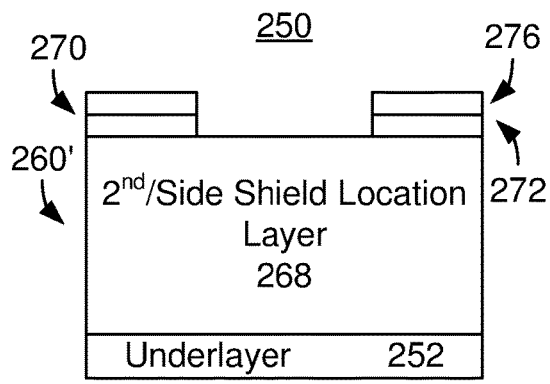
Figure 11C:
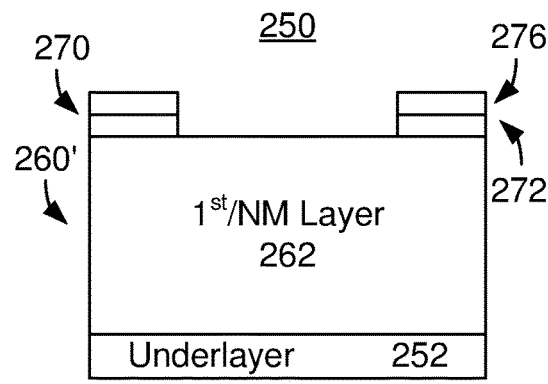
Figure 11D:
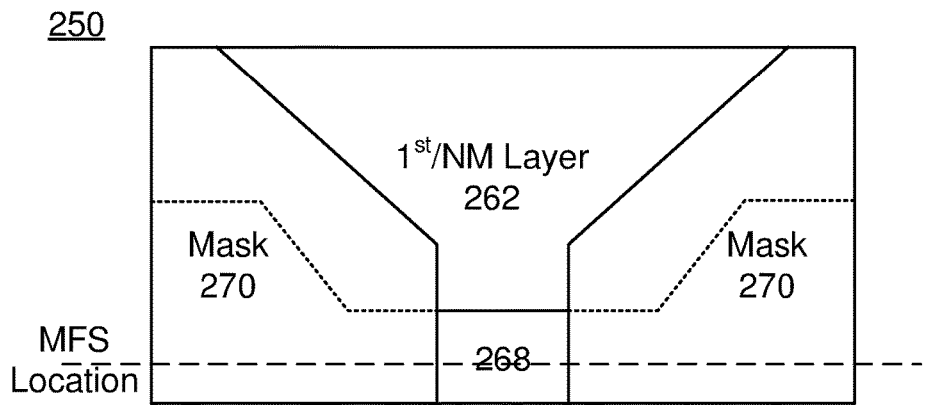
Figure 12A:
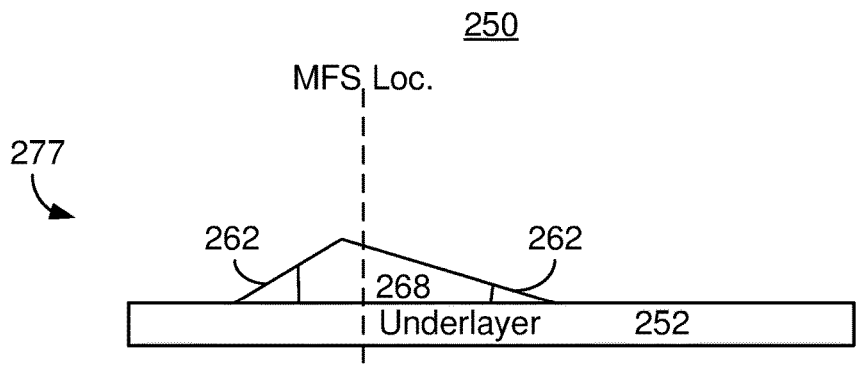
Figure 12B:
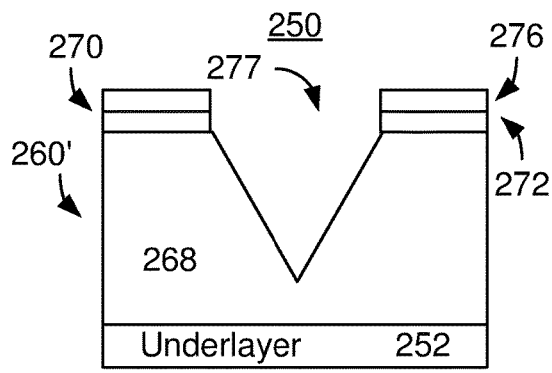
Figure 12C:
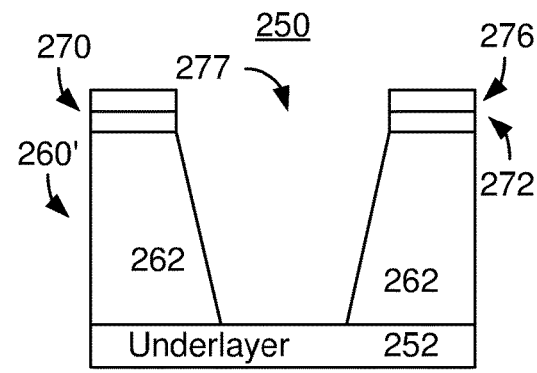
Figure 12D:
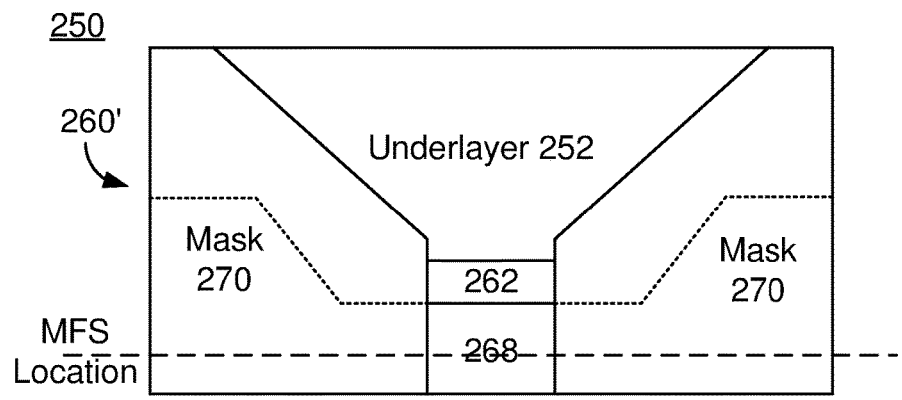
Figure 13A:
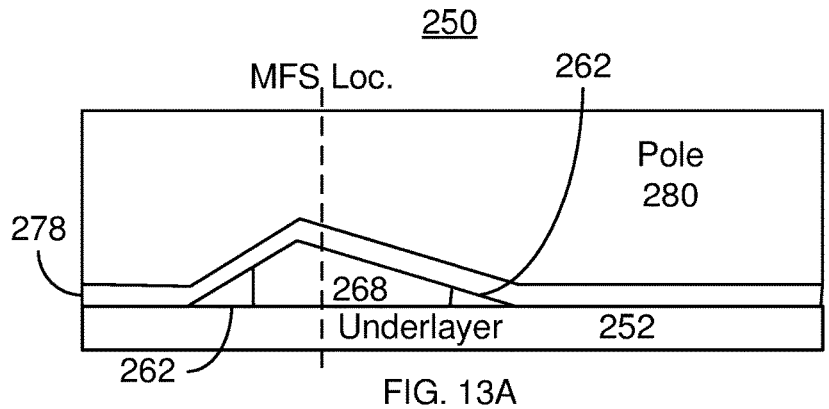
Figure 13B:
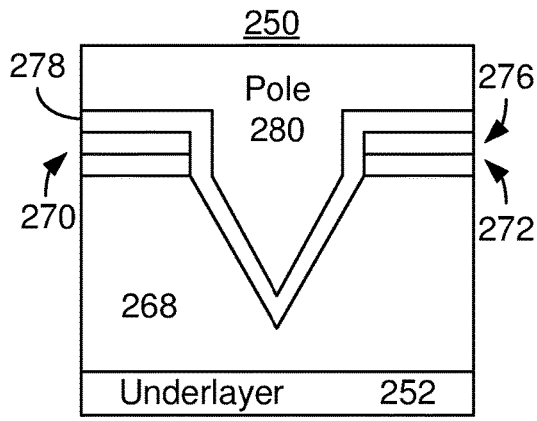
Figure 13C:
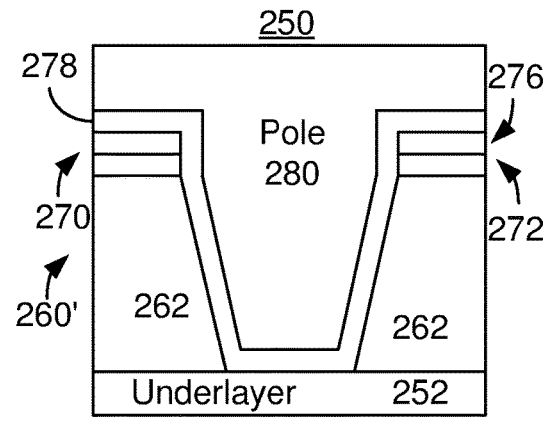
Figure 13D:
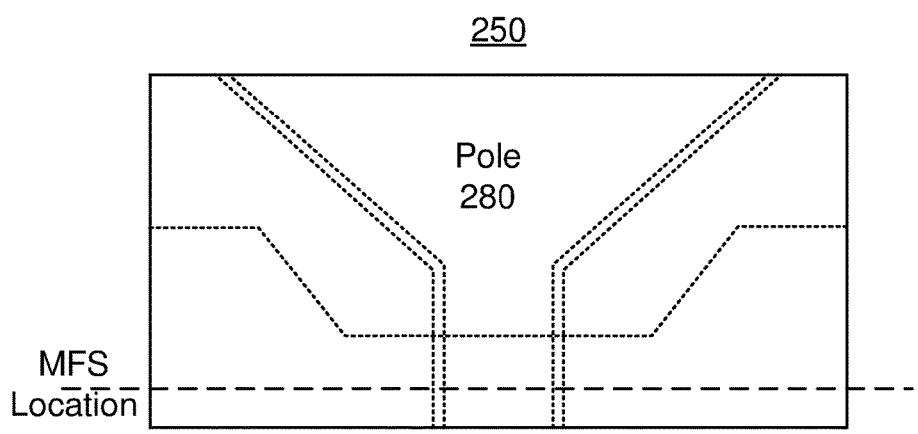
Figure 14A:
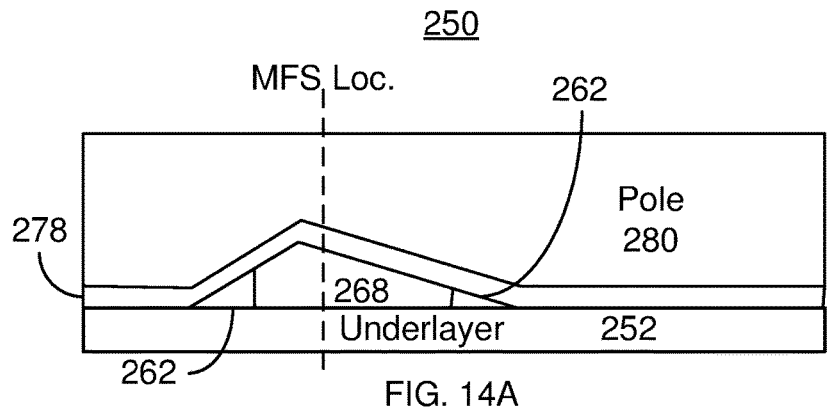
Figure 14B:
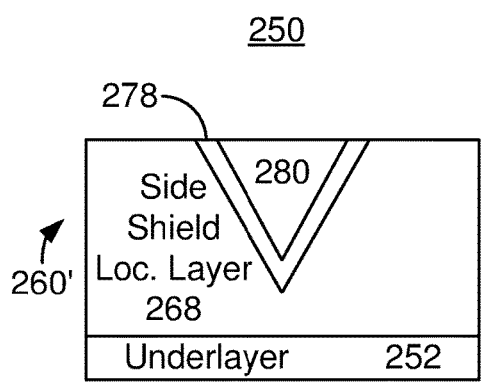
Figure 14C:
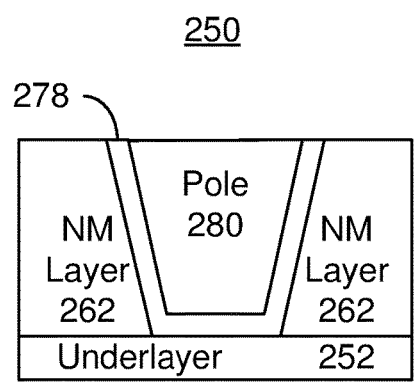
Figure 14D:
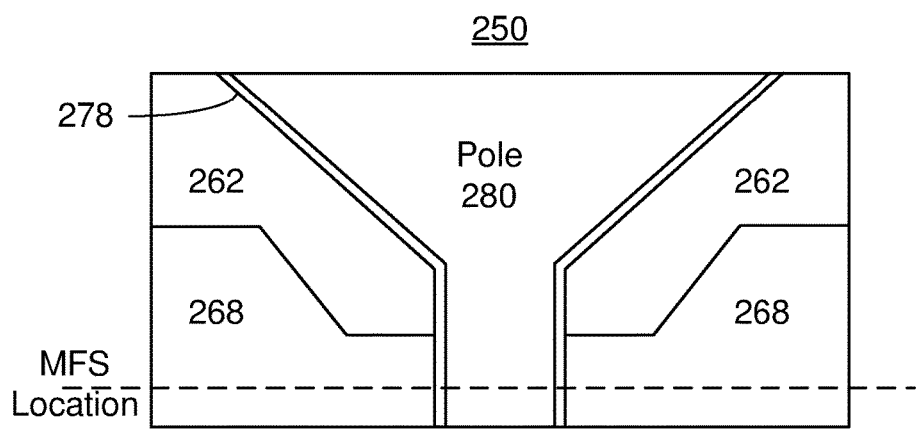
Figure 15A:
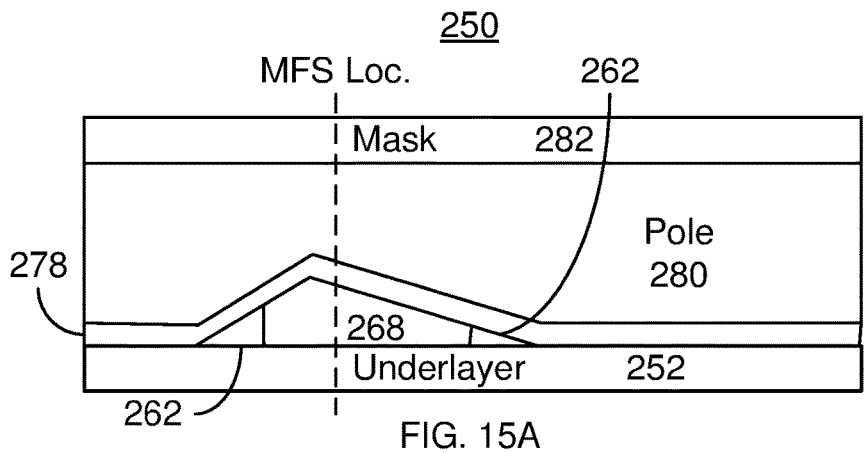
Figure 15B:
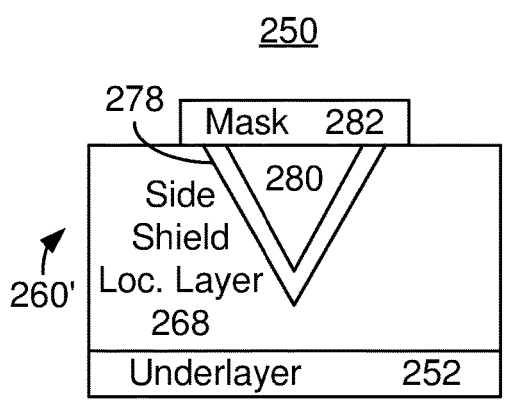
Figure 15C:
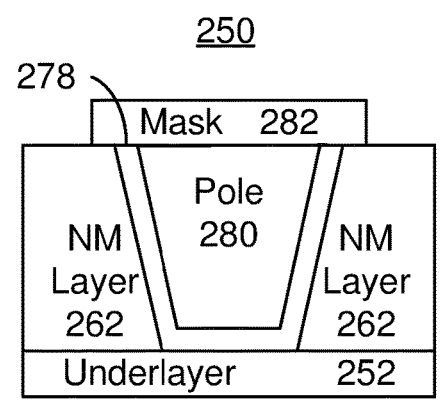
Figure 15D:
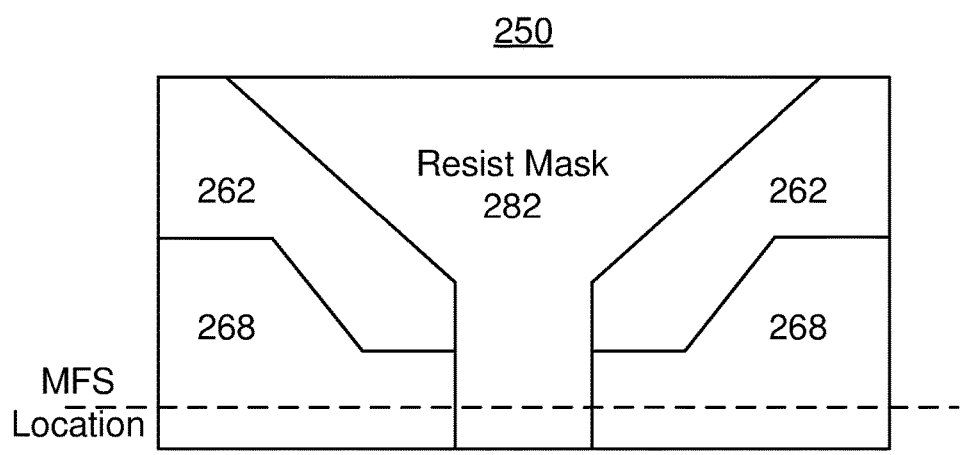
Figure 16A:
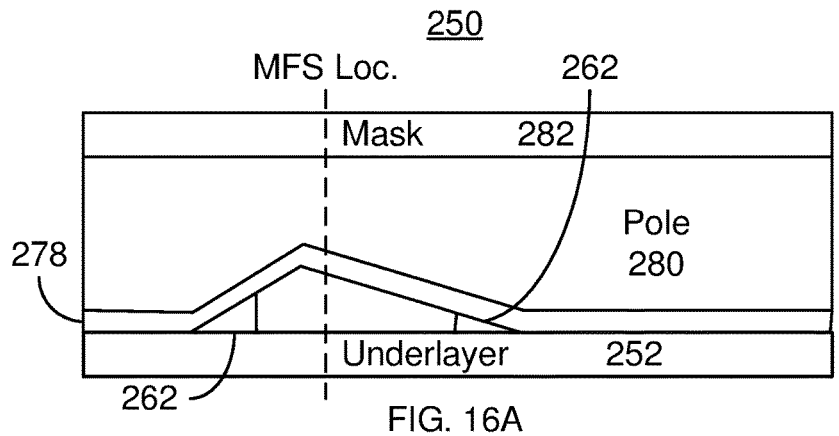
Figure 16B:
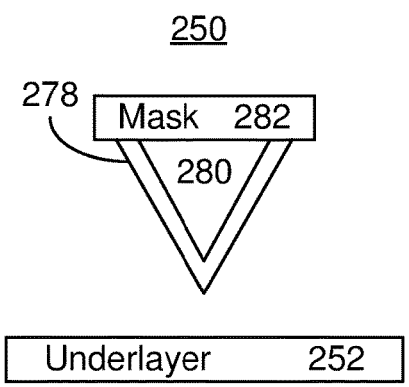
Figure 16C:
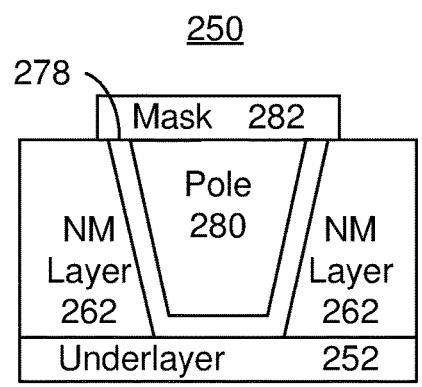
Figure 16D:
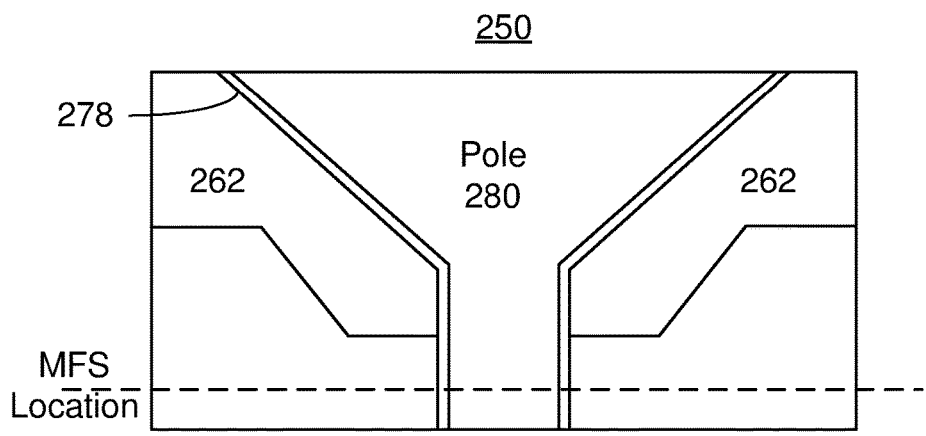
Figure 17A:
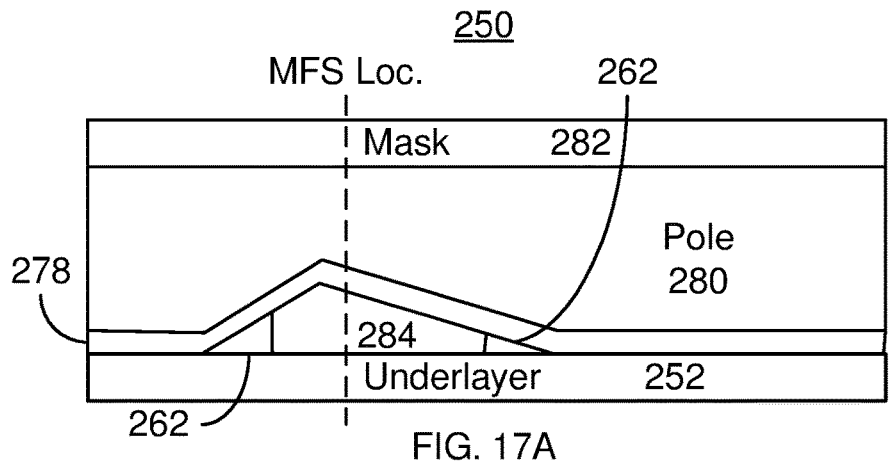
Figure 17B:
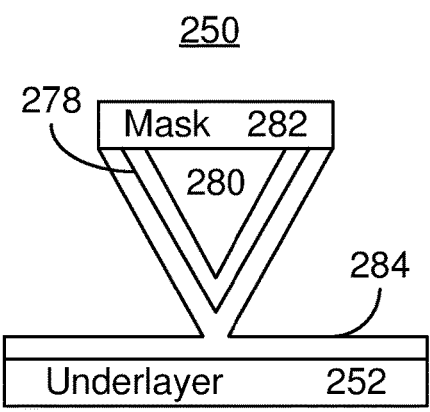
Figure 17C:
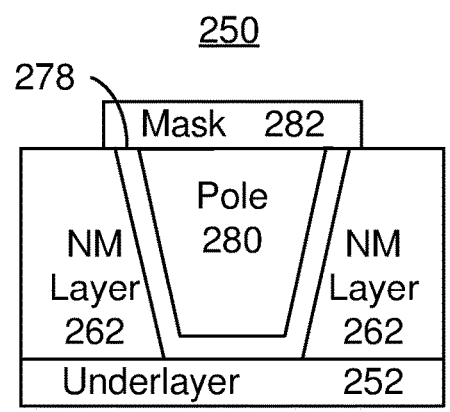
Figure 17D:
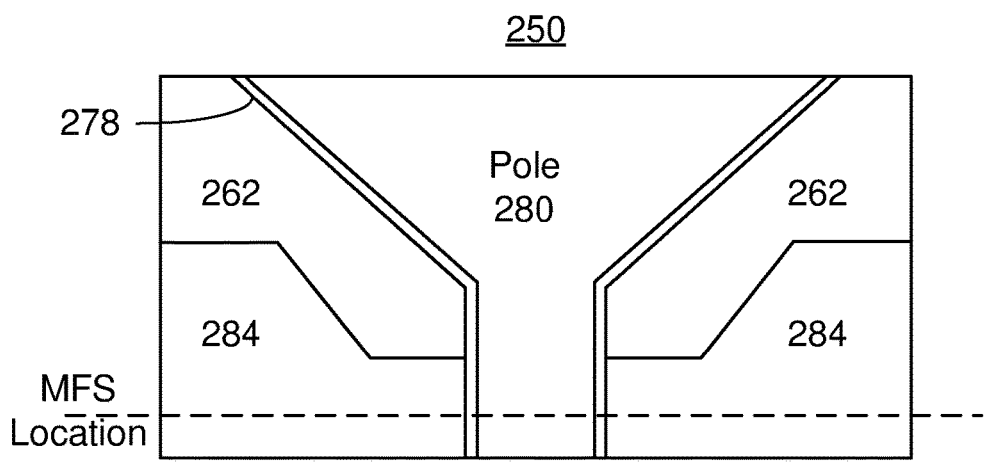

A pole trench is formed in the intermediate layer 260', via step 128. Step 128 includes forming a mask for the pole trench. In some embodiments, the mask to be formed is a hard mask. Thus, a Cr hard mask layer may be deposited and a photoresist mask formed on the Cr layer. A Ta hard mask layer is deposited on the resist mask. FIGS. 10A, 10B and 10C depict apex, MFS and top views of the magnetic write apparatus 250 after deposition of the Ta layer. Thus, a Cr layer 272, a photoresist mask 274 and Ta layer 276 are formed. A lift off process removes the photoresist mask 274. The Ta layer 276 thus has an aperture in the region formerly occupied by the photoresist mask 274. A Cr RIE may be used to remove the underlying Cr layer 272 exposed by the Ta layer 276. Thus, a hard mask may be formed. FIGS. 11A, 11B, 11C and 11D depict apex, MFS, recessed and top views of the magnetic write apparatus 250 after formation of the hard mask 270. Thus, hard mask 270 includes hard mask layers 272 and 276. The hard mask 270 also has an aperture over the region in which the pole is to be formed. Once the hard mask 270 is formed, an RIE is performed as part of step 128 to provide a pole trench in the intermediate layer 260'. FIGS. 12A, 12B, 12C and 12D depict apex, MFS and top views of the magnetic write apparatus 250 after step 128 is completed. Thus, a trench 277 has been formed in the intermediate layer 260'. The trench 277 includes a portion in the side shield location layer 268 and a portion in the nonmagnetic layer 262. The RIE performed in step 128 may be an aluminum oxide or NiFe RIE. Such an RIE may also remove the silicon dioxide layer 262. The RIE of step 128 thus has an etch selectivity of at least 0.9 and not more than 1.1 for the layers 262 and 268. The pole trench 277 has a shape and a location corresponding to the pole being formed.

A nonmagnetic gap layer is provided, via step 130. For example, Ru may be deposited using chemical vapor deposition (CVD). A portion of the nonmagnetic gap layer resides in the pole trench. A pole is provided in the trench, via step 132. Step 132 includes depositing the magnetic material(s) for the pole. FIGS. 13A, 13B, 13C and 13D depict apex, MFS and top views of the magnetic write apparatus 250 after the pole material(s) have been deposited. Thus, a gap layer 278 and pole material(s) 280 are shown. The pole materials are planarized for example using a CMP. A trailing edge bevel may also be formed. FIGS. 14A, 14B, 14C and 14D depict apex, MFS and top views of the magnetic write apparatus 250 after step 132 is completed. Thus, a pole 280 has been formed.

A remaining portion of the side shield location layer 268 is removed using a wet etch, via step 134. Step 134 may include providing a mask that covers the pole 280. Step 134 may include using a NiFe or aluminum oxide wet etch. FIGS. 15A, 15B, 15C and 15D depict apex, MFS and top views of the magnetic write apparatus 250 after the mask 282 has been provided. In some embodiments, the mask 282 is a photoresist mask. FIGS. 16A, 16B, 16C and 16D depict apex, MFS and top views of the magnetic write apparatus 250 after step 134 is completed. Thus, the sacrificial side shield location layer 268 has been removed.

A high moment seed layer for the side shields may optionally be provided, via step 136. Step 136 may include using a directional deposition, for example ion beam deposition. FIGS. 17A, 17B, 17C and 17D depict apex, MFS and top views of the magnetic write apparatus 250 after step 136 is performed. Thus, a seed layer 284 is formed. An optional ion beam etch may be performed to remove the seed layer from regions other than the sides of the pole, via step 138.

Figure 18A:
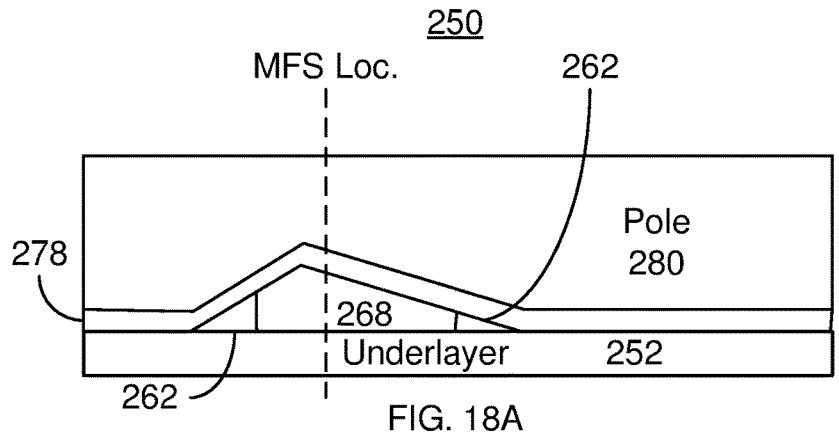
Figure 18B:
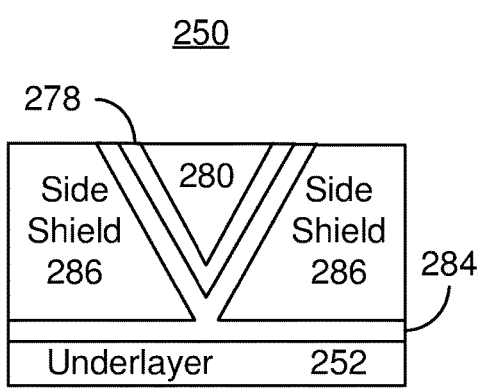
Figure 18C:
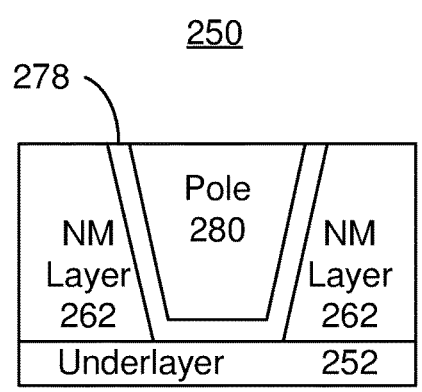
Figure 18D:
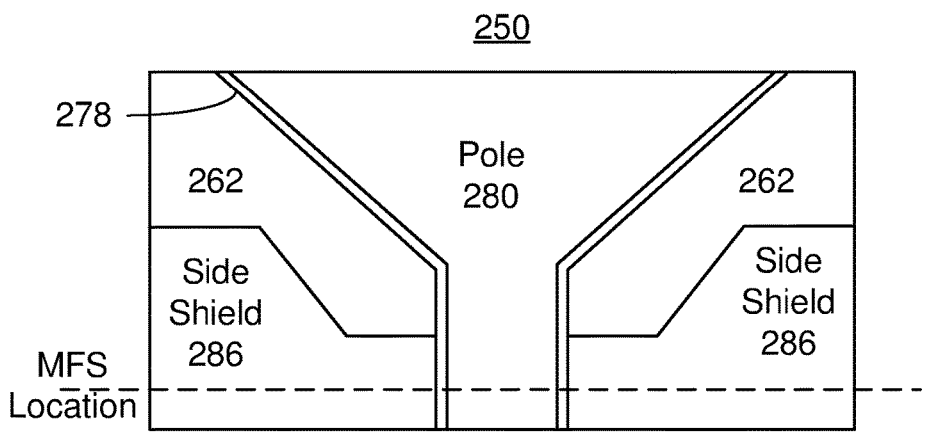

The material(s) for the side shield are provided, via step 140. FIGS. 18A, 18B, 18C and 18D depict apex, MFS and top views of the magnetic write apparatus 250 after step 140 is performed and after the mask 282 is removed. Thus, the side shields 286 are shown. As can be seen in FIG. 18D, the back of the side shield 286 matches the back surface of the side shield location layer 268, shown previously.

Using the method 110, the magnetic recording apparatus 250 may be provided. The use of the side shield location layer 268 may prevent or reduce formation of tails and/or other features that may adversely affect the throat height and/or other characteristics of the side shields 286. The desired configuration of the side shields 286 may be achieved. Thus, flux shunting and other issues with performance may be mitigated. Thus, performance of the write apparatus 250 may be improved.

Figure 19:
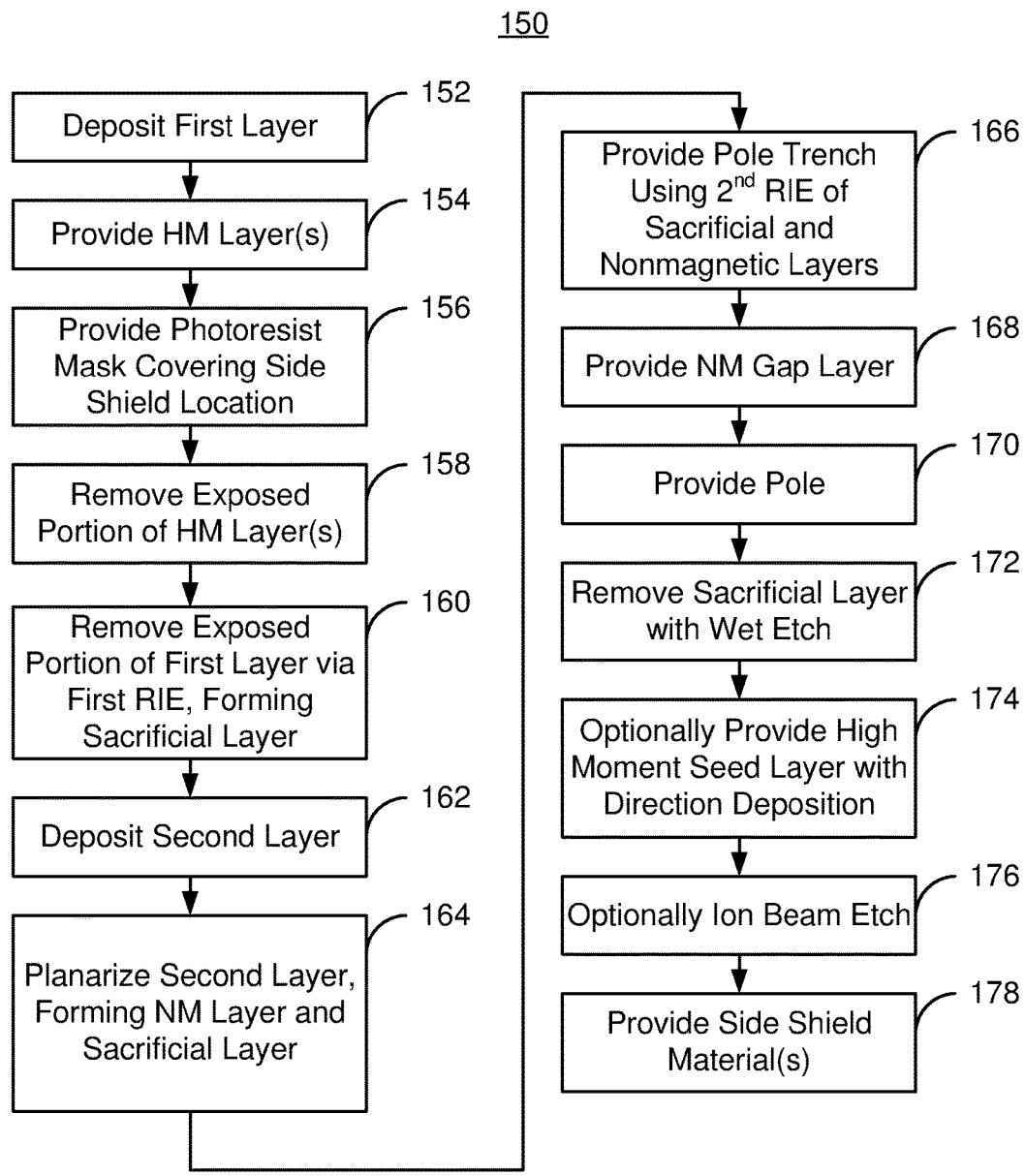
FIG. 19 is a flow chart depicting an exemplary embodiment of a method for providing magnetic recording apparatus.

FIG. 19 depicts an exemplary embodiment of a method 150 for providing a magnetic recording apparatus such as the magnetic recording apparatus 210. For simplicity, some steps may be omitted, interleaved, combined and/or include substeps. FIGS. 20A-20C through FIGS. 25A-25D depict various views of an exemplary embodiment of a magnetic recording apparatus 250' during fabrication using the method 150. The method 150 is thus described in the context of providing the magnetic recording apparatus 250'. The method 150 may also be used to fabricate other magnetic recording apparatuses including but not limited to the data storage device 250'. The method 150 is described in the context of a single device but may be used to fabricate multiple magnetic storage apparatuses at substantially the same time. The method 150 is also described in the context of particular layers. A particular layer may include multiple materials and/or multiple sub-layers. The method 150 also may start after formation of other portions of the magnetic recording apparatus. For example, the method 150 may start after a read apparatus, return pole/leading shield and/or other structure have been fabricated.

Figure 20A:
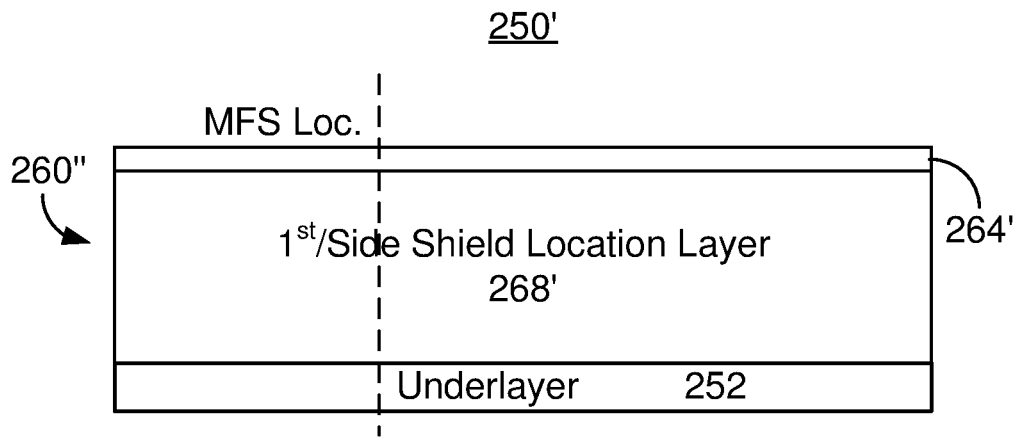
Figure 20B:
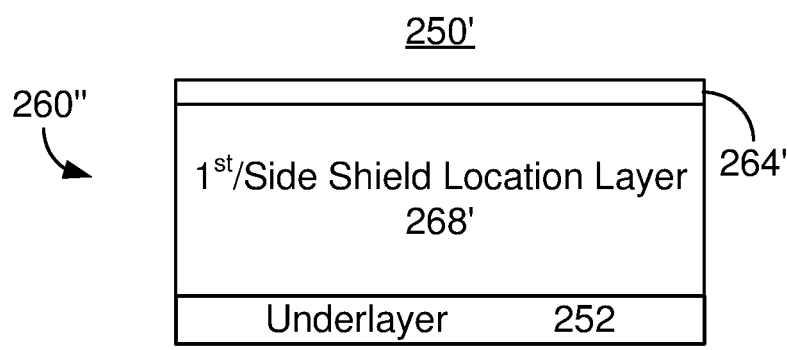
Figure 20C:
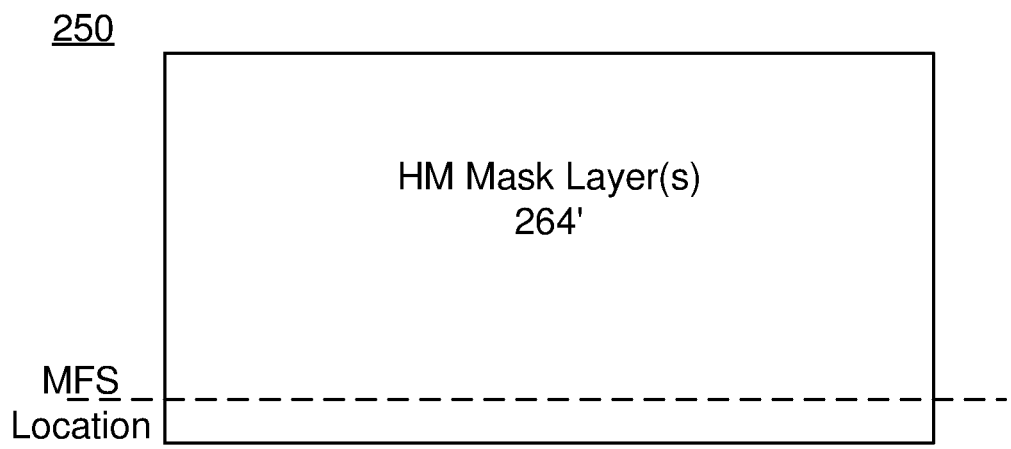

A first layer is full-film deposited, via step 152. The first layer will form the side shield location layer and may be selected from aluminum oxide and NiFe. At least one hard mask layer is deposited on the first layer, via step 154. For example, a Cr layer may be deposited in step 154. FIGS. 20A, 20B and 20C depict apex, MFS and top views of the magnetic write apparatus 250' after step 154 is completed. Thus, the first nonmagnetic layer 268' has been provided on an underlayer 252. The nonmagnetic layer 268' is part of an intermediate layer 260" that is being formed. Also shown is the hard mask layers 264'. Also shown in FIG. 20C is an MFS location, where the MFS will be located. For example, an ABS may be formed after lapping.

Figure 21A:
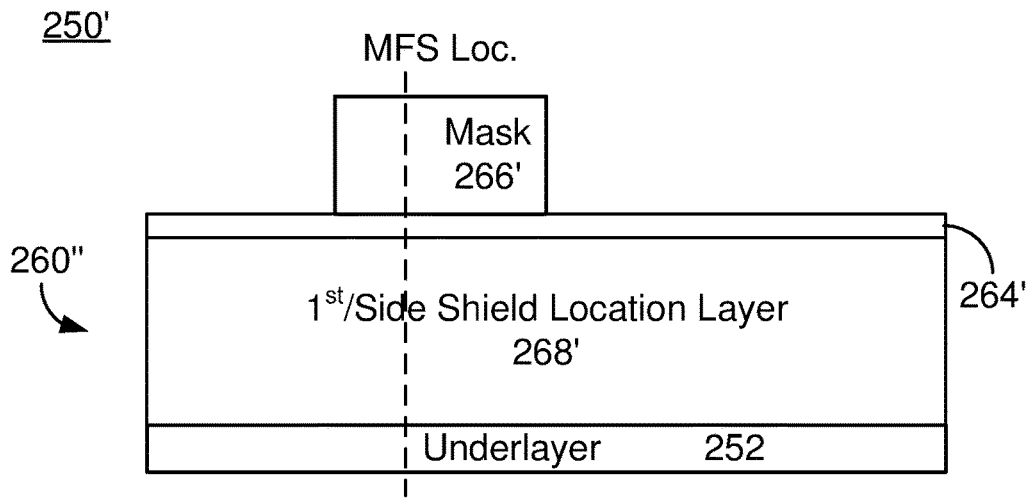
Figure 21B:
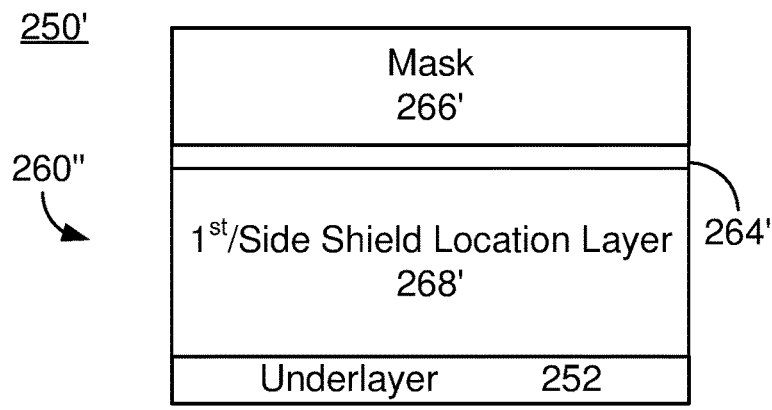
Figure 21C:
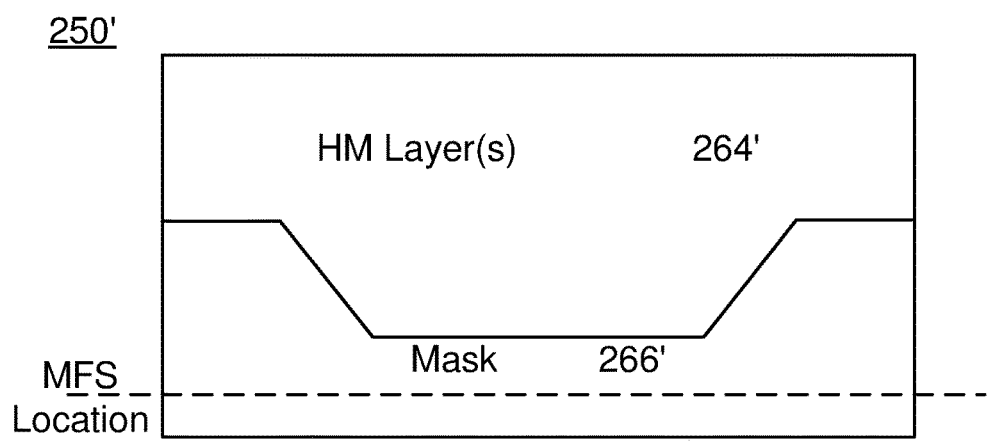

A photoresist mask is provided, via step 156. FIGS. 21A, 21B and 21C depict apex, MFS and top views of the magnetic write apparatus 250' after step 116' is completed. Thus, a photoresist mask 266' has been formed. The mask 266' covers the region corresponding to the side shields.

Figure 22A:
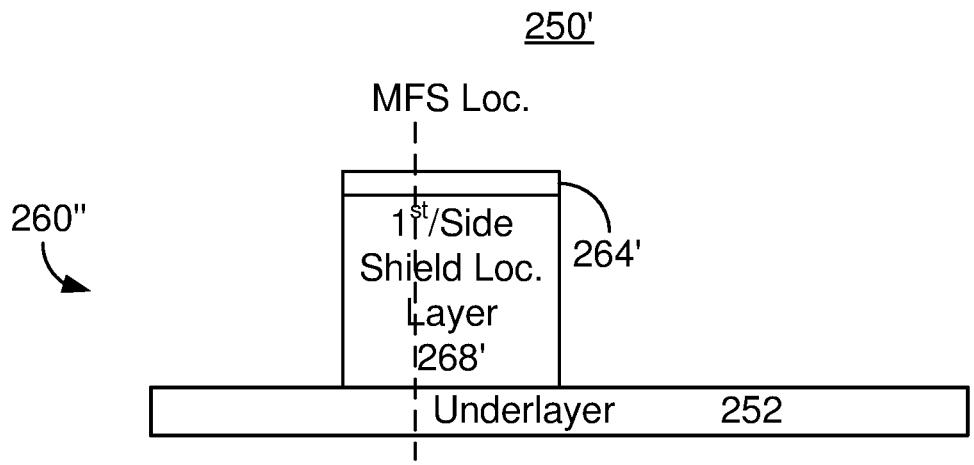
Figure 22B:
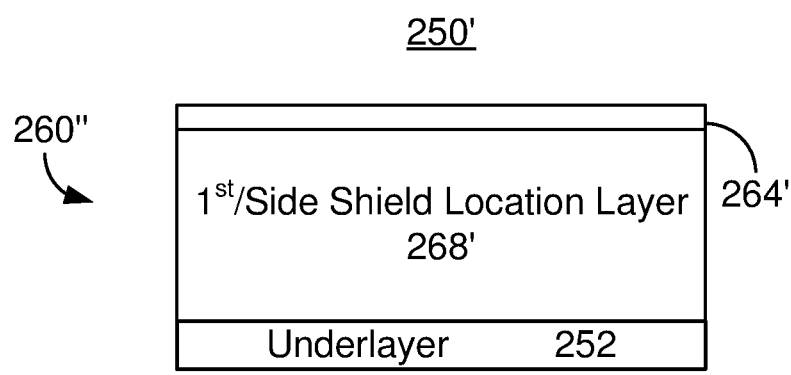
Figure 22C:
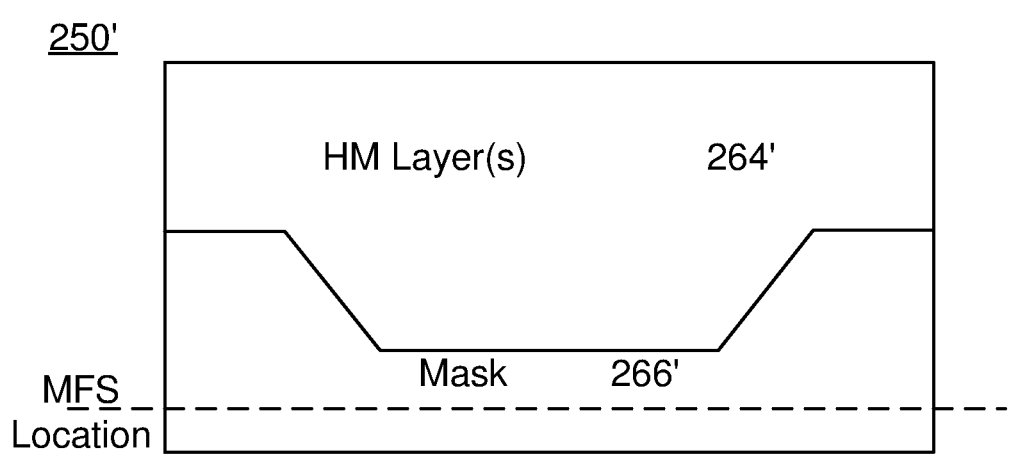

An exposed portion of the hard mask layer 264' is removed to form a hard mask 264' covering the same region as the photoresist mask 266', via step 158. Step 158 may include performing a Cr RIE to remove the hard mask layers 264' in the region exposed by the photoresist mask 266. A portion of the side shield location layer 268' exposed by the hard mask 264' is removed, via step 160. Step 160 may include performing an aluminum oxide and/or NiFe RIE. FIGS. 22A, 22B and 22C depict apex, MFS and top views of the magnetic write apparatus 250' after step 160 is performed. Thus, a side shield location layer 268' having a shape and location corresponding to the side shields is formed. The side shield location layer 268' has a back surface and at least one side surface. A portion of the back surface corresponds to the back surface of the side shield(s).

Figure 23A:
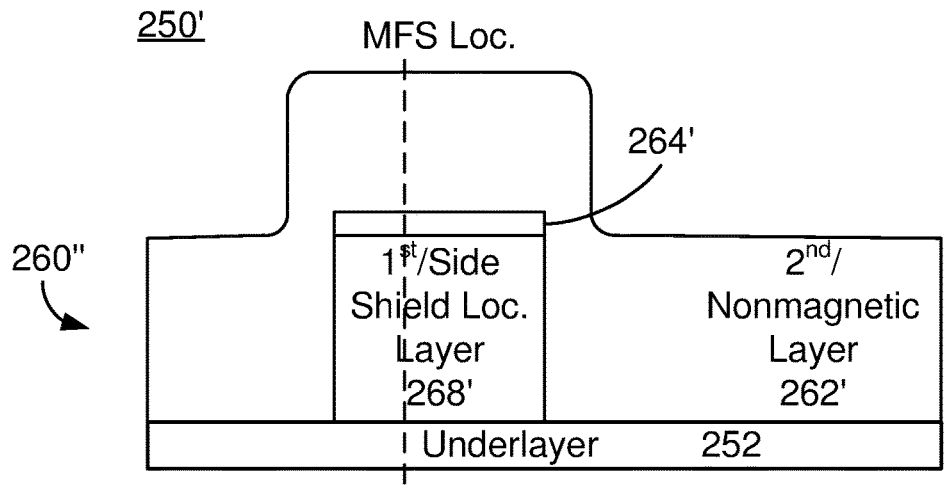
Figure 23B:
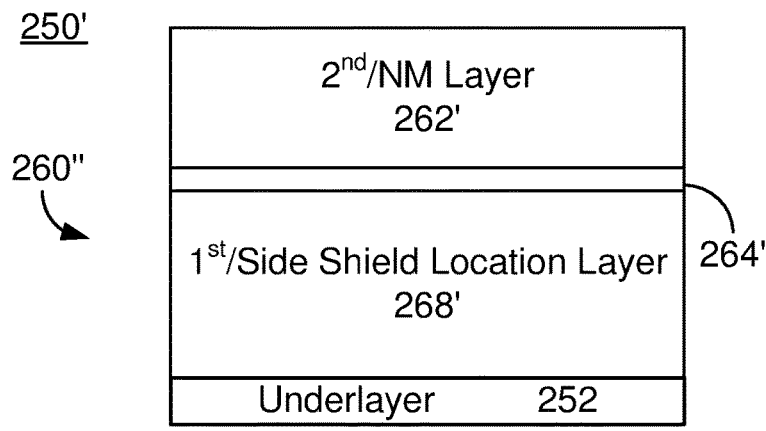
Figure 23C:
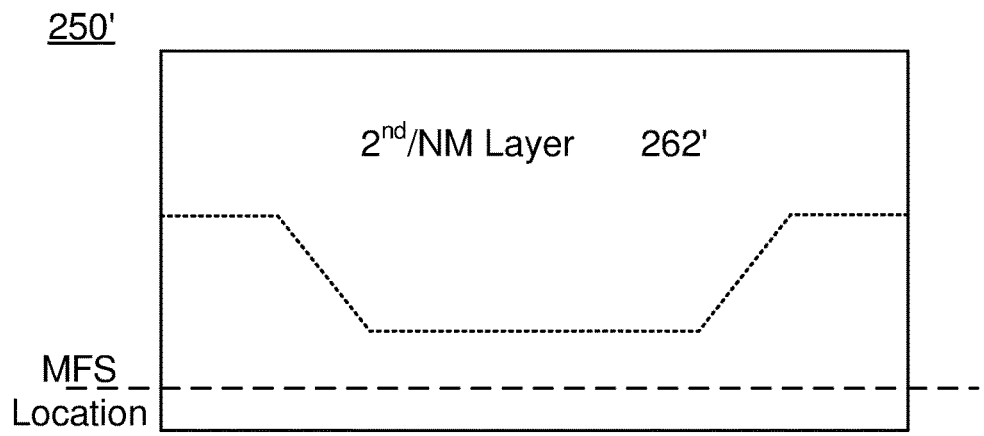

A second layer is deposited, via step 162. Step 162 includes performing a full film deposition. FIGS. 23A, 23B and 23C depict apex, MFS and top views of the magnetic write apparatus 250 after step 162 is performed. Thus, the second layer 262' is present. The second layer 262' is a nonmagnetic layer, such as a silicon dioxide layer.

Figure 24A:
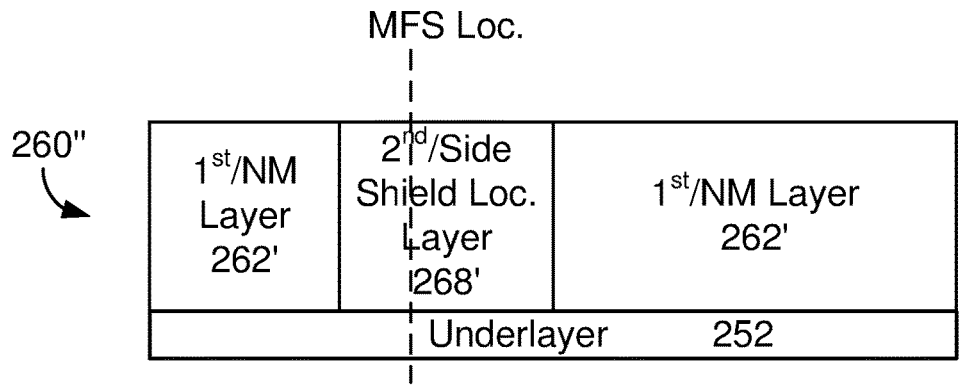
Figure 24B:
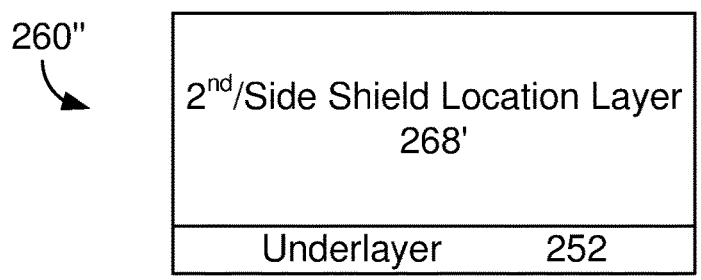
Figure 24C:
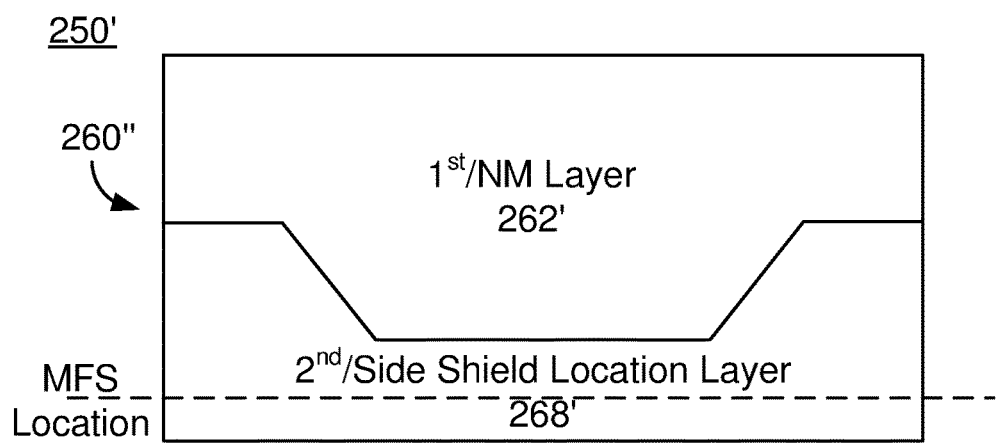

The second layer 262' is planarized, via step 164. Thus, the portion of the second layer 262' covering the first layer 268' is removed. In addition, the hard mask layer(s) 264' have been removed. FIGS. 24A, 24B and 24C depict apex, MFS and top views of the magnetic write apparatus 250 after step 164 is completed. A remaining portion of the second layer 262' in the trench forms a nonmagnetic layer on the sides of the side shield location layer 268'. The nonmagnetic layer 262' and the side shield location layer 268' form an intermediate layer 260".

A pole trench is formed in the intermediate layer 260", via step 166. Step 166 is analogous to step 128. Thus, step 166 includes forming a mask for the pole trench. In some embodiments, the mask to be formed is a hard mask. Thus, a Cr hard mask layer may be deposited and a photoresist mask formed on the Cr layer. A Ta hard mask layer is deposited on the resist mask. A lift off process removes the photoresist mask. The Ta layer thus has an aperture in the region formerly occupied by the photoresist mask. A Cr RIE may be used to remove the underlying Cr layer exposed by the Ta layer. Thus, a hard mask may be formed. The hard mask also has an aperture over the region in which the pole is to be formed. Once the hard mask is formed, an RIE is performed as part of step 166 to provide a pole trench in the intermediate layer 260". The resulting device is analogous to the magnetic recording apparatus 250 shown in FIGS. 12A-12D. The trench formed in step 166 includes a portion in the side shield location layer 268' and a portion in the nonmagnetic layer 262'. The RIE performed in step 166 may be an aluminum oxide or NiFe RIE. Such an RIE may also remove the silicon dioxide layer 262'. The RIE of step 166 thus has an etch selectivity of at least 0.9 and not more than 1.1 for the layers 262' and 268'. The pole trench has a shape and a location corresponding to the pole being formed.

A nonmagnetic gap layer is provided, via step 168. For example, Ru may be deposited using CVD. A portion of the nonmagnetic gap layer resides in the pole trench. A pole is provided in the trench, via step 170. Step 170 includes depositing the magnetic material(s) for the pole. The pole materials may also be planarized for example using a CMP. A trailing edge bevel may also be formed. The resulting magnetic recording apparatus is analogous to that shown in FIGS. 14A-14D.

A remaining portion of the side shield location layer 268' is removed using a wet etch, via step 172. Step 172 may include providing a mask that covers the pole and then performing the wet etch. In some embodiments, the mask is a photoresist mask. The wet etched used may be a NiFe wet etch or an aluminum oxide wet etch. The magnetic recording apparatus 250' after step 172 is performed is analogous to the magnetic recording apparatus 250 shown in FIGS. 16A-16D.

A high moment seed layer for the side shields may optionally be provided, via step 174. Step 174 may include using a directional deposition, for example ion beam deposition. The magnetic recording apparatus 250' after step 174 may be analogous to the magnetic write apparatus 250 shown in FIGS. 17A-17D. An optional ion beam etch may be performed to remove the seed layer from regions other than the sides of the pole, via step 176.

Figure 25A:
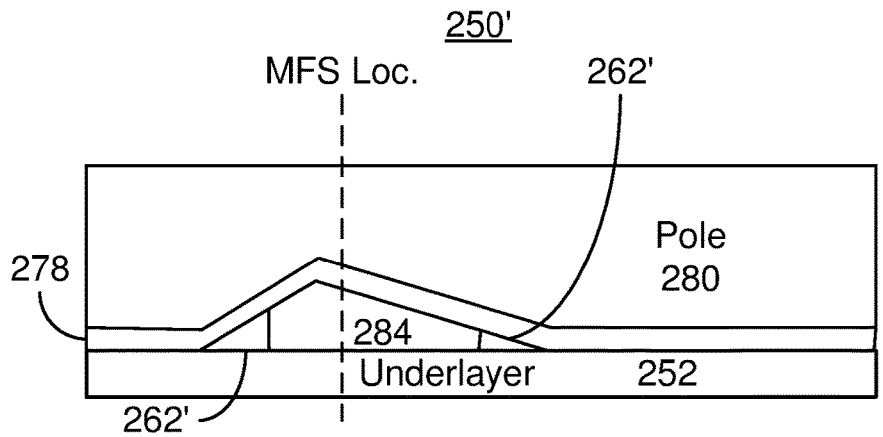
Figure 25B:
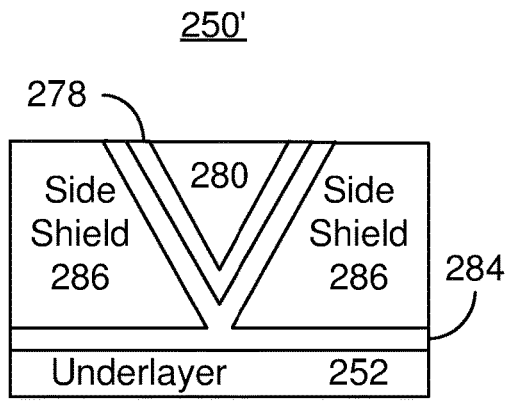
Figure 25C:
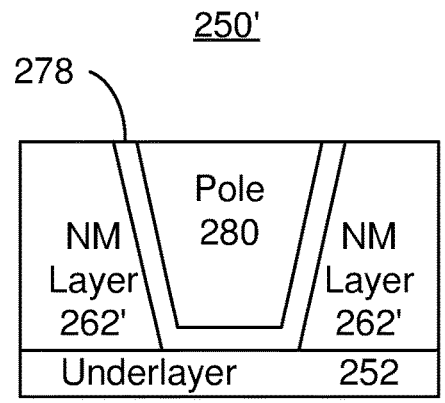
Figure 25D:
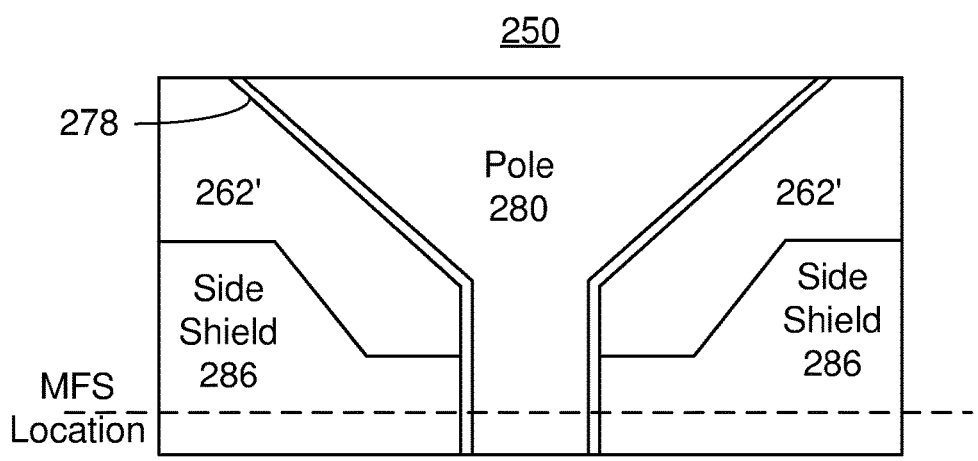

The material(s) for the side shield are provided, via step 178. FIGS. 25A, 25B, 25C and 25D depict apex, MFS and top views of the magnetic write apparatus 250' after step 178 is performed. Thus, the gap layer 278, pole 280, optional seed layer 284 and side shields 286 are shown. As can be seen in FIG. 25D, the back of the side shield 286 matches the back surface of the side shield location layer 268', shown previously.

Using the method 150, the magnetic recording apparatus 250' may be provided. The use of the side shield location layer 268' may prevent or reduce formation of tails and/or other features that may adversely affect the throat height or other characteristics of the side shields 286'. Thus, flux shunting and other issues with performance may be mitigated. Thus, performance of the write apparatus 250' may be improved.

What is claimed is:

1. A method for providing magnetic write apparatus having a media-facing surface (MFS) comprising:
   providing a side shield location layer covering at least part of a MFS location corresponding to the MFS, the side shield location layer having a back surface and at least one side surface, a portion of the back surface corresponding to a side shield back surface of at least one side shield, at least part of the side shield location layer having a location corresponding to the at least one side shield, the back surface being separated from the MFS location along a yoke direction substantially perpendicular to the MFS location;
   providing a nonmagnetic layer adjoining the back surface and the at least one side surface of the side shield location layer, the nonmagnetic layer and the side shield location layer forming an intermediate layer;
   providing a pole trench in the intermediate layer using a first etch, the pole trench including a nonmagnetic layer portion and a side shield location layer portion, the at least one side surface of the side shield location layer being separated from the side shield location layer portion of the pole trench along a cross-track direction, the nonmagnetic layer and the side shield location layer having an etch selectivity of at least 0.9 and not more than 1.1 for the first etch, the pole trench having a pole trench shape and a pole trench location corresponding to a pole;
   providing the pole in the pole trench, a portion of the side shield location layer residing under a portion of the pole after the step of providing the pole;
   removing a remaining portion of the side shield location layer using a wet etch, the side shield location layer being removable by the wet etch, the nonmagnetic layer being nonremovable by the wet etch, the remaining portion of the side shield location layer includes the portion of the side shield location layer under the pole;
   providing in the location the at least one side shield having a side shield back surface substantially the same as the portion of the back surface; and
   providing at least one coil for energizing the pole.

2. The method of claim 1 wherein the step of providing the side shield location layer further includes:
   full film depositing a first layer;
   providing a mask covering the first layer at the location; and
   removing a portion of the first layer exposed by the mask, a remaining portion of the first layer forming the side shield location layer.

3. The method of claim 2 wherein the step of providing the mask further includes:
   depositing at least one hard mask layer;
   providing a photoresist mask covering the at least one hard mask layer at the location;
   removing an exposed portion of the at least one hard mask layer to form a hard mask at the location; and wherein the step of removing the portion of the first layer further includes
   reactive ion etching the first layer; and
   removing the hard mask after the reactive ion etching step.

4. The method of claim 2 wherein the step of providing the nonmagnetic layer further includes:
   full film depositing a second layer after formation of the side shield location layer, a portion of the second layer covering the side shield location layer; and
   planarizing the second layer such that the portion of the second layer covering the side shield location layer is removed.

5. The method of claim 1 wherein the step of providing the nonmagnetic layer further includes:
   full film depositing a first layer;
   providing a mask covering the first layer, a portion of the first layer at the location being exposed; and
   removing the portion of the first layer exposed by the mask, a remaining portion of the first layer forming the nonmagnetic layer.

6. The method of claim 5 wherein the step of providing the mask further includes:
   depositing at least one hard mask layer;
   providing a photoresist mask exposing the at least one hard mask layer at the location; and
   removing an exposed portion of the at least one hard mask layer to form a hard mask that exposes the location; and wherein the step of removing the portion of the first layer further includes
   reactive ion etching the first layer; and
   removing the hard mask after the reactive ion etching step.

7. The method of claim 5 wherein the step of providing the side shield location layer further includes:
   full film depositing a second layer after formation of the nonmagnetic location layer, a portion of the second layer covering the nonmagnetic layer; and
   planarizing the second layer such that the portion of the second layer covering the nonmagnetic is removed.

8. The method of claim 1 wherein the side shield location layer includes at least one of aluminum oxide and NiFe and the nonmagnetic layer includes silicon dioxide.

9. The method of claim 1 wherein the step of providing the at least one side shield further includes:
   depositing a seed layer for the at least one side shield.

10. The method of claim 1 wherein the back surface has a first portion substantially parallel to at least one pole sidewall and at a first distance from the at least one pole sidewall, a second portion substantially parallel to the MFS and a third portion substantially parallel to the at least one pole sidewall and at a second distance from the at least one pole sidewall, the second portion being between the first and third portion such that the first distance is different from the second distance.

11. A method for providing magnetic write apparatus having a media-facing surface (MFS) comprising:
    full film depositing a first layer, the first layer being at least one of aluminum oxide and NiFe;
    depositing at least one hard mask layer on the first layer;
    providing a photoresist mask covering the at least one hard mask layer at a location corresponding to at least one side shield, the location including at least part of a MFS location corresponding to the MFS;
    removing an exposed portion of the at least one hard mask layer to form a hard mask at the location;
    removing a portion of the first layer exposed by the hard mask using a first reactive ion etch (RIE), a remaining portion of the first layer forming a side shield location layer at the location, the side shield location layer having a back surface and at least one side surface, a portion of the back surface corresponding to a side shield back surface of the at least one side shield, the back surface being separated from the MFS location along a yoke direction substantially perpendicular to the MFS location;

removing the hard mask after the step of removing the portion of the first layer using the first RIE;

full film depositing a second layer after formation of the side shield location layer, a portion of the second layer covering the side shield location layer, the second layer including silicon dioxide;

planarizing the second layer such that the portion of the second layer covering the side shield location layer is removed, a remaining portion of the second layer forming a nonmagnetic layer adjoining the back surface and the at least one side surface of the side shield location layer, the nonmagnetic layer and the side shield location layer forming an intermediate layer;

performing a second RIE to provide a pole trench in the intermediate layer, the pole trench including a nonmagnetic layer portion and a side shield location layer portion, the nonmagnetic layer and the side shield location layer having an etch selectivity of at least 0.9 and not more than 1.1 for the second RIE, the pole trench having a pole trench shape and a pole trench location corresponding to a pole, the at least one side surface of the side shield location layer being separated from the side shield location layer portion of the pole trench along a cross-track direction;

depositing a nonmagnetic gap layer, a portion of the nonmagnetic gap layer residing in the pole trench;

providing the pole in the pole trench, a portion of the side shield location layer residing under a portion of the pole after the step of providing the pole;

removing a remaining portion of the side shield location layer using a wet etch, the side shield location layer being removable by the wet etch, the nonmagnetic layer being nonremovable by the wet etch, the remaining portion of the side shield location layer including the portion of the side shield location layer under the pole;

providing in the location the at least one side shield having a side shield back surface substantially the same as the portion of the back surface; and providing at least one coil for energizing the pole.

12. The method of claim 11 wherein the step of providing in the location the at least one side shield further includes:
depositing a seed layer for the at least one side shield.

13. A method for providing magnetic write apparatus having a media-facing surface (MFS) comprising:
full film depositing a first layer, the first layer being a silicon dioxide layer;
depositing at least one hard mask layer on the first layer;
providing a photoresist mask exposing the at least one hard mask layer at a location corresponding to at least one side shield, the location including at least part of a MFS location corresponding to the MFS;

removing an exposed portion of the at least one hard mask layer to form a hard mask having an aperture at the location;

removing a portion of the first layer exposed by the hard mask using a first reactive ion etch (RIE), a remaining portion of the first layer forming a nonmagnetic layer having a trench at the location, the trench having a back surface and at least one side surface, a portion of the back surface corresponding to a side shield back surface of the at least one side shield;

removing the hard mask after the step of removing the portion of the first layer using the first RIE;

full film depositing a second layer after formation of the side shield location layer, a portion of the second layer covering the nonmagnetic layer, the second layer being at least one of aluminum oxide and NiFe;

planarizing the second layer such that the portion of the second layer covering the nonmagnetic layer is removed, a remaining portion of the second layer in the trench forming a side shield location layer having the location, adjoining the back surface of the trench and adjoining the at least one side surface of the trench, the back surface being separated from the MFS location along a yoke direction substantially perpendicular to the MFS location, the nonmagnetic layer and the side shield location layer forming an intermediate layer;

performing a second RIE to provide a pole trench in the intermediate layer, the pole trench including a nonmagnetic layer portion and a side shield location layer portion, the nonmagnetic layer and the side shield location layer having an etch selectivity of at least 0.9 and not more than 1.1 for the second RIE, the pole trench having a pole trench shape and a pole trench location corresponding to pole, the at least one side surface being separated from the side shield location layer portion of the pole trench along a cross-track direction;

depositing a nonmagnetic gap layer, a portion of the nonmagnetic gap layer residing in the pole trench;

providing the pole in the pole trench, a portion of the side shield location layer residing under a portion of the pole after the step of providing the pole;

removing a remaining portion of the side shield location layer using a wet etch, the side shield location layer being removable by the wet etch, the nonmagnetic layer being nonremovable by the wet etch, the remaining portion of the side shield location layer including the portion of the side shield location layer under the pole;

providing in the location the at least one side shield having a side shield back surface substantially the same as the portion of the back surface; and providing at least one coil for energizing the pole.

14. The method of claim 13 wherein the step of forming the at least one side shield further includes:
depositing a seed layer for the at least one side shield.

* * * * *